United States Patent
Nakamura et al.

(10) Patent No.: US 11,454,005 B2
(45) Date of Patent: Sep. 27, 2022

(54) HYDRAULIC EXCAVATOR

(71) Applicant: Hitachi Construction Machinery Co., Ltd., Tokyo (JP)

(72) Inventors: Satoshi Nakamura, Hitachinaka (JP); Kunitsugu Tomita, Kashiwa (JP); Kazunori Hoshino, Tsukuba (JP); Shigeru Bandou, Adachi-ku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 514 days.

(21) Appl. No.: 16/493,010

(22) PCT Filed: Sep. 21, 2018

(86) PCT No.: PCT/JP2018/035212
§ 371 (c)(1),
(2) Date: Sep. 11, 2019

(87) PCT Pub. No.: WO2019/059383
PCT Pub. Date: Mar. 28, 2019

(65) Prior Publication Data
US 2020/0115888 A1 Apr. 16, 2020

(30) Foreign Application Priority Data
Sep. 21, 2017 (JP) .............................. JP2017-181789

(51) Int. Cl.
*E02F 9/26* (2006.01)
*E02F 3/32* (2006.01)
(Continued)

(52) U.S. Cl.
CPC .................. *E02F 9/26* (2013.01); *E02F 3/32* (2013.01); *E02F 9/2004* (2013.01);
(Continued)

(58) Field of Classification Search
CPC . E02F 3/32; E02F 3/434; E02F 9/2004; E02F 9/2025; E02F 9/2271; E02F 9/26; G01G 19/10; G01G 19/16
See application file for complete search history.

(56) References Cited

U.S. PATENT DOCUMENTS 5,528,498 A * 6/1996 Scholl ..................... E02F 3/437
701/50
5,714,719 A 2/1998 Otsuka et al.
(Continued)

FOREIGN PATENT DOCUMENTS

EP 0 129 422 A2 12/1984
EP 1 445 386 A1 8/2004
(Continued)

OTHER PUBLICATIONS

Korean-language Office Action issued in Korean Application No. 10-2019-7025128 dated Oct. 19, 2020 (six (6) pages).
(Continued)

*Primary Examiner* — Tyler J Lee
(74) *Attorney, Agent, or Firm* — Crowell & Moring LLP

(57) ABSTRACT

A controller (21) of a hydraulic excavator (1) performs a first determination of determining whether or not loading of an object to be worked onto a dump truck (2) by the hydraulic excavator has been conducted based on a posture of a work implement (12), calculates a first load that is a load of the object to be worked loaded onto the dump truck by the hydraulic excavator based on a thrust force of a boom cylinder (16) and on a determination result of the first determination, performs a third determination of determining whether or not the first load is to be integrated based on a determination result of a second determination of determining whether or not the loading of the object to be worked onto the dump truck by the hydraulic excavator has been conducted that is transmitted from a controller (40) of the (Continued)

dump truck and on the determination result of the first determination, and calculates a loaded weight on the dump truck by integrating the first load in a case where it is determined by the third determination that the first load is to be integrated.

6 Claims, 16 Drawing Sheets

(51) Int. Cl.
    *E02F 9/20*     (2006.01)
    *G01G 19/10*     (2006.01)
    *G01G 19/16*     (2006.01)
    *E02F 9/22*     (2006.01)

(52) U.S. Cl.
    CPC .......... *E02F 9/2025* (2013.01); *E02F 9/2271* (2013.01); *G01G 19/10* (2013.01); *G01G 19/16* (2013.01)

(56) References Cited

U.S. PATENT DOCUMENTS

| | | | | |
|---|---|---|---|---|
| 6,157,889 A * | 12/2000 | Baker | .................... | G01G 19/12 701/124 |
| 2005/0000703 A1 | 1/2005 | Furuno et al. | | |
| 2009/0228394 A1 | 9/2009 | Mintah et al. | | |
| 2012/0143434 A1 | 6/2012 | Donnelli et al. | | |
| 2012/0290178 A1 * | 11/2012 | Suzuki | .................... | E02F 9/265 701/50 |
| 2014/0019042 A1 * | 1/2014 | Sugawara | ............... | E21C 41/26 701/431 |
| 2014/0231153 A1 | 8/2014 | Fukasu et al. | | |
| 2018/0106709 A1 * | 4/2018 | Cherney | ................. | G01F 22/00 |
| 2018/0171594 A1 * | 6/2018 | Tsuji | ......................... | E02F 9/26 |
| 2018/0179732 A1 * | 6/2018 | Bartsch | .................... | E02F 9/205 |

FOREIGN PATENT DOCUMENTS

| | | | |
|---|---|---|---|
| JP | 10-37254 | A | 2/1998 |
| JP | 3787046 | B2 | 6/2006 |
| JP | 3830151 | B2 | 10/2006 |
| JP | 2008-240461 | A | 10/2008 |
| JP | 2011-516755 | A | 5/2011 |
| JP | 2012-215495 | A | 11/2012 |
| JP | 2014-505860 | A | 3/2014 |
| JP | 2015-40422 | A | 3/2015 |

OTHER PUBLICATIONS

International Search Report (PCT/ISA/210) issued in PCT Application No. PCT/JP2018/035212 dated Dec. 25, 2018 with English translation (three (3) pages).

Japanese-language Written Opinion (PCT/ISA/237) issued in PCT Application No. PCT/JP2018/035212 dated Dec. 25, 2018 (three (3) pages).

International Preliminary Report on Patentability (PCT/IB/338 & PCT/IB/373) issued in PCT Application No. PCT/JP2018/035212 dated Apr. 2, 2020, including English translation of document C2 (Japanese-language Written Opinion (PCT/ISA/237) previously filed on Sep. 11, 2019) five pages.

Extended European Search Report issued in European Application No. 18858189.6 dated May 28, 2021 (eight (8) pages).

\* cited by examiner

HYDRAULIC EXCAVATOR

TECHNICAL FIELD

The present invention relates to a hydraulic excavator that calculates the loaded weight of an object to be worked that has been loaded onto a hauling machine.

BACKGROUND ART

In general, a work machine represented by a hydraulic excavator may perform an operation of loading an excavated matter (this may herein be referred to as "object to be worked") onto a hauling machine such as a dump truck (loading work), in the case of, for example, excavation of a mineral and loading of the mineral onto the dump truck at a mine.

At the time of such an operation, if the loading amount onto the hauling machine (the total weight of the object to be worked on the hauling machine) can be set to a suitable amount, a lowering in production amount due to insufficient loading or wastefulness of reloading due to overloading can be reduced, and production efficiency in the site can be enhanced.

A general method for setting the loading amount onto the hauling machine to a suitable amount may include measuring the load of the excavated matter during when the hydraulic excavator (loading machine) is conveying the excavated matter, integrating the load measured during a loading work onto the hauling machine to calculate the loading amount onto the hauling machine, and presenting the loading amount to the operator of the hydraulic excavator. With the loading amount onto the hauling machine thus presented, the operator of the hydraulic excavator can regulate the excavation amount at the next time and thereafter, and, therefore, the loading amount onto the hauling machine can be set to a suitable amount. In addition, with the loading amount onto the hauling machine and the load of the excavated matter under conveyance presented, the operator of the hydraulic excavator can judge whether or not the loading of the excavated matter being conveyed results in overloading, and, therefore, overloading can be prevented.

As a device for measuring the loading amount onto the hauling machine, JP-3787046-B2 discloses a work amount monitoring device for a hydraulic excavator, in which in a case where the load difference between an in-bucket load during a swing operation for conveying the conveyed matter (object to be worked) onto the hauling machine and an in-bucket load during a swing operation after the conveyed matter is released onto the hauling machine is equal to or more than a predetermined value and where a bucket dump operation is carried out within a predetermined angle range in the swing direction, the in-bucket load immediately before the bucket dump operation is calculated and integrated as a conveyed matter weight onto the hauling machine.

PRIOR ART DOCUMENT

Patent Document

Patent Document 1: JP-3787046-B2

SUMMARY OF THE INVENTION

Problem to be Solved by the Invention

In the work amount monitoring device for the hydraulic excavator disclosed in JP-3787046-B2, the presence or absence of loading (soil dropping) onto the hauling machine is determined based on only the hydraulic excavator side information of the swing angle and the bucket dump operation, and, therefore, it is difficult to accurately determined whether or not the object to be worked has actually been loaded onto the hauling machine. For example, in a case where a bucket dump operation is generated in a predetermined swing angle range by other operation than loading, the weight of the object to be worked may be measured and integrated erroneously, with the bucket dump operation as a trigger. In addition, in a case where the dump truck is moved to outside of a predetermined angle range and thereafter a bucket dump operation is performed erroneously within the predetermined angle range, the loading of the object to be worked onto the dump truck would be failed. In the technology of the above document, however, the weight of the object to be worked would be measured and integrated even in such a case.

It is an object of the present invention to provide a hydraulic excavator capable of correctly detecting the throwing of an object to be worked onto a hauling machine and capable of accurately outputting a loading amount onto the hauling machine.

Means for Solving the Problem

The present application includes a plurality of means for solving the above-mentioned problem. As an example of the means, there is provided a hydraulic excavator including a hydraulic cylinder driven by a hydraulic fluid delivered from a hydraulic pump, a work implement driven by the hydraulic cylinder, and a controller that calculates a loaded weight of an object to be worked loaded onto a hauling machine by the work implement. The controller performs a first determination of determining whether or not the loading of the object to be worked onto the hauling machine by the hydraulic excavator has been conducted based on posture of the work implement, calculates a first load that is a load of the object to be worked loaded onto the hauling machine by the hydraulic excavator based on a thrust force of the hydraulic cylinder and a determination result of the first determination, performs a third determination of determining whether or not the first load is to be integrated based on a determination result of a second determination of determining whether or not the loading of the object to be worked onto the hauling machine by the hydraulic excavator has been conducted that is transmitted from a hauling machine side controller possessed by the hauling machine and on the determination result of the first determination, and calculates the loaded weight on the hauling machine by integrating the first load in a case where it is determined by the third determination that the first load is to be integrated.

Effects of the Invention

According to the present invention, that loading of the object to be worked has been completed is determined based on information from both the hydraulic excavator and the hauling machine. Therefore, the throwing of the object to be worked from the hydraulic excavator onto the hauling machine is detected correctly, and the loading amount onto the hauling machine can be accurately computed.

MODES FOR CARRYING OUT THE INVENTION

An embodiment of the present invention will be described below, using the drawings. A case where a hydraulic excavator is utilized as a loading machine constituting a load measuring system for a work machine and a dump truck is utilized as a hauling machine will be described below.

In addition, for convenience herein, a "loading work (conveying work)" onto the dump truck (hauling machine) by the hydraulic excavator (loading machine) is defined as an operation including four motions, that is, A) an "excavating motion" of excavating an object to be worked (matter to be conveyed) and loading the object to be worked into a bucket (see FIG. 3), B) a "conveying motion" of moving the bucket to an upper side of a cargo bed of the dump truck by combination of a swing of an upper swing structure and a motion of a front work implement, C) a "loading operation" (see FIG. 4) of releasing (soil dropping) the object to be worked in the bucket onto the cargo bed of the dump truck, and D) a "reaching motion" of moving the bucket to a desired position over the object to be worked for starting the excavating motion. In many cases, the hydraulic excavator performs these four motions repeatedly in this order, thereby filling the cargo bed of the dump truck with the object to be worked. The conveying motion of B) is in many cases performed by swing boom raising. The loading operation of C) is in many cases performed by bucket dumping. The loading machine to which the present invention pertains is not limited to a hydraulic excavator having a bucket as an attachment, but includes a hydraulic excavator having a member capable of holding and releasing a matter to be conveyed, such as a grapple and a lifting magnet. In addition, the present invention is applicable also to a wheel loader or the like including a work arm that cannot be swung like the hydraulic excavator.

<General Configuration>

Figure 1:
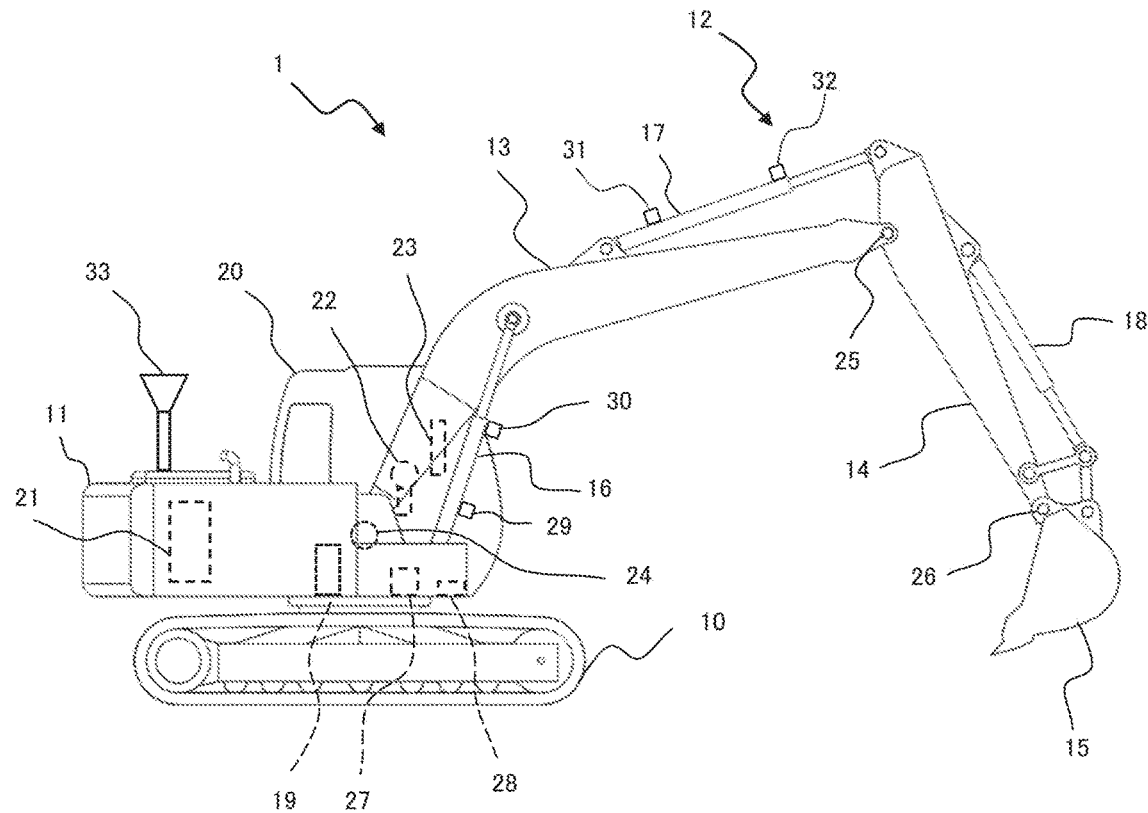
FIG. 1 is a side view of a hydraulic excavator according to an embodiment of the present invention.
Figure 2:
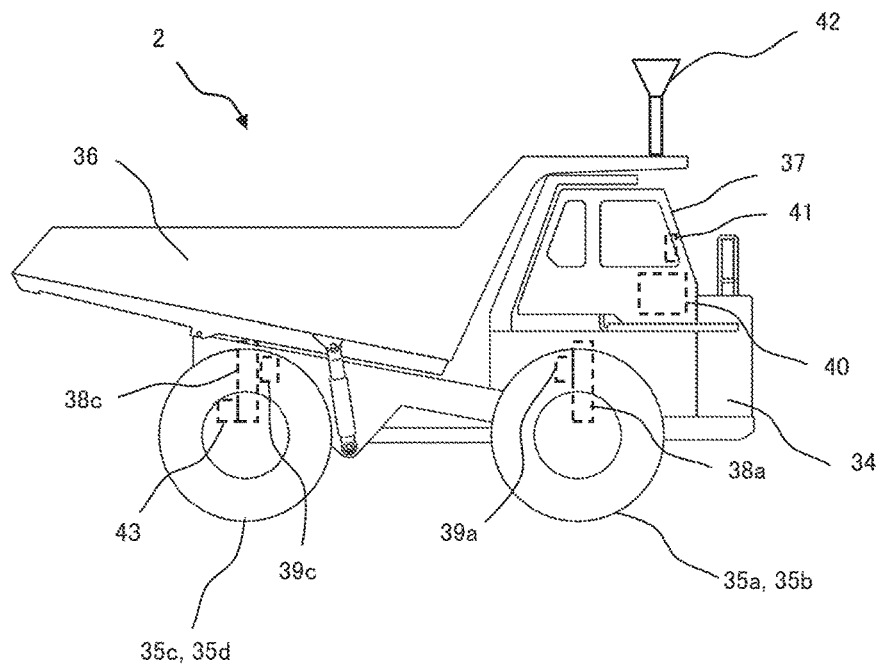
FIG. 2 is a side view of a dump truck according to the embodiment of the present invention.

FIG. 1 is a side view of a hydraulic excavator according to the present embodiment, and FIG. 2 is a side view of a dump truck according to the present embodiment.

A hydraulic excavator 1 of FIG. 1 includes: a lower track structure 10; an upper swing structure 11 to be swingable provided at an upper part of the lower track structure 10; a front work implement 12 that is an articulated work arm mounted on a front side of the upper swing structure 11; a swing motor 19 that is a hydraulic motor for swinging the upper swing structure 11; an operation room 20 which is provided on the upper swing structure 11 and into which an operator ride to operate the excavator 1; a control lever 22 provided in the operation room 20 for controlling motions of actuators mounted on the hydraulic excavator 1; and a controller 21 that includes a storage device (for example, ROM or RAM), a calculation processing device (for example, CPU) and an input/output device and that controls operations of the hydraulic excavator 1.

The front work implement 12 includes: a boom 13 rotatably provided on the upper swing structure 11; an arm 14 rotatably provided at a tip of the boom 13; a bucket (attachment) 15 rotatably provided at a tip of the arm 14; a boom cylinder 16 as a hydraulic cylinder that drives the boom 13; an arm cylinder 17 as a hydraulic cylinder that drives the arm 14; and a bucket cylinder 18 as a hydraulic cylinder that drives the bucket 15. The boom cylinder 16, the arm cylinder 17 and the bucket cylinder 18 are individually driven by a hydraulic fluid delivered from a hydraulic pump (not illustrated) mounted on the upper swing structure 11.

A boom angle sensor 24, an arm angle sensor 25 and a bucket angle sensor 26 are attached respectively to rotary shafts of the boom 13, the arm 14 and the bucket 15. Respective rotational angles of the boom 13, the arm 14 and the bucket 15 can be acquired from these angle sensors 24, 25 and 26. In addition, a swing angular velocity sensor 27 and an inclination angle sensor 28 are attached to the upper swing structure 11, and they are configured such that swing angular velocity of the upper swing structure 11 and inclination angle in the front-rear direction of the upper swing structure 11 can be acquired. Posture of the front work implement 12 can be specified from detection values at the angle sensors 24, 25, 26, 27 and 28.

A boom bottom pressure sensor 29 and a boom rod pressure sensor 30, and an arm bottom pressure sensor 31 and an arm rod pressure sensor 32 are attached respectively to the boom cylinder 16 and the arm cylinder 17, such that the pressure inside each hydraulic cylinder can be acquired. Thrust forces of the cylinders 16 and 18, that is, driving forces given to the front work implement 12 can be specified from detection values at the pressure sensors 29, 30, 31 and 32.

Note that the boom angle sensor 24, the arm angle sensor 25, the bucket angle sensor 26, the inclination angle sensor 28 and the swing angular velocity sensor 27 may be replaced by other sensors insofar as the other sensors can detect physical quantities concerning the posture of the front work implement 12. For instance, the boom angle sensor 24, the arm angle sensor 25 and the bucket angle sensor 26 can be each replaced by an inclination angle sensor or an inertia measuring unit (IMU). In addition, the boom bottom pressure sensor 29, the boom rod pressure sensor 30, the arm bottom pressure sensor 31 and the arm rod pressure sensor 32 can be replaced by other sensors insofar as the other sensors can detect physical quantities concerning the thrust forces generated by the boom cylinder 16 and the arm cylinder 17, that is, the driving forces given to the front work implement 12. Further, instead of detecting the thrust forces or driving forces, moving speeds of the boom cylinder 16 and the arm cylinder 17 may be detected by stroke sensors, or moving speeds of the boom 13 and the arm 14 may be detected by IMUs, thereby detecting the motions of the front work implement 12.

An external input/output device 23 that displays measurement results of a load measuring system is provided inside the operation room 20, and a wireless transceiver 33 for the controller 21 to communicate with an external controller (for example, a controller 40) is attached to an upper surface of the upper swing structure 11.

As the external input/output device 23, there are provided a display device 23A (see FIG. 3) that displays results of calculation in the controller 21 and the like, and an input device 23B (see FIG. 3) for an operator to input information to the controller 21. As the display device 23A, there can be utilized, for example, a liquid crystal display. As the input device 23B, there can be utilized, for example, a ten-key pad, a touch panel, a keyboard or the like.

The dump truck 2 of FIG. 2 includes a machine body 34, four tires 35a, 35b, 35c and 35d attached individually to front and rear axles (not illustrated) provided on the machine body 34, a vessel 36 as a cargo bed into which a matter to be loaded is thrown by the hydraulic excavator 1, and an operation room 37 into which the operator rides to operate the dump truck 2.

Four suspensions 38a, 38b, 38c and 38d that support the machine body 34 are attached to the axles. The suspensions 38a, 38b, 38c and 38d are provided with suspension pressure sensors 39a, 39b, 39c and 39d (first machine status sensors) for measuring the pressures of suspensions. The suspension pressure sensors 39a, 39b, 39c and 39d detects the suspension pressures as physical quantities concerning the weight of the object to be worked that is loaded into the dump truck 2.

The controller 40 that includes a storage device (for example, ROM or RAM), a calculation processing device (for example, CPU) and an input/output device and that controls the dump truck 2, and a wireless transceiver 42 for the controller 40 to communicate with an external controller (for example, the controller 21) are attached to the machine body 34. A display device 41 for displaying machine body information on the dump truck 2 is provided inside the operation room 37. As the display device 41, there can be utilized, for example, a liquid crystal display. In addition, the machine body 34 is provided with a machine speed sensor (third machine body status sensor) 43 that measures the traveling speed of the dump truck 2.

Note that the suspension pressure sensors 39a, 39b, 39c and 39d can be replaced by other sensors insofar as the other sensors can detect physical quantities concerning the weight of the object to be worked loaded into the dump truck 2 by the hydraulic excavator 1. In addition, the machine speed sensor 43 can be replaced by other sensor insofar as the other sensor can detect a physical quantity concerning the traveling status of the dump truck 2.

Figure 3:
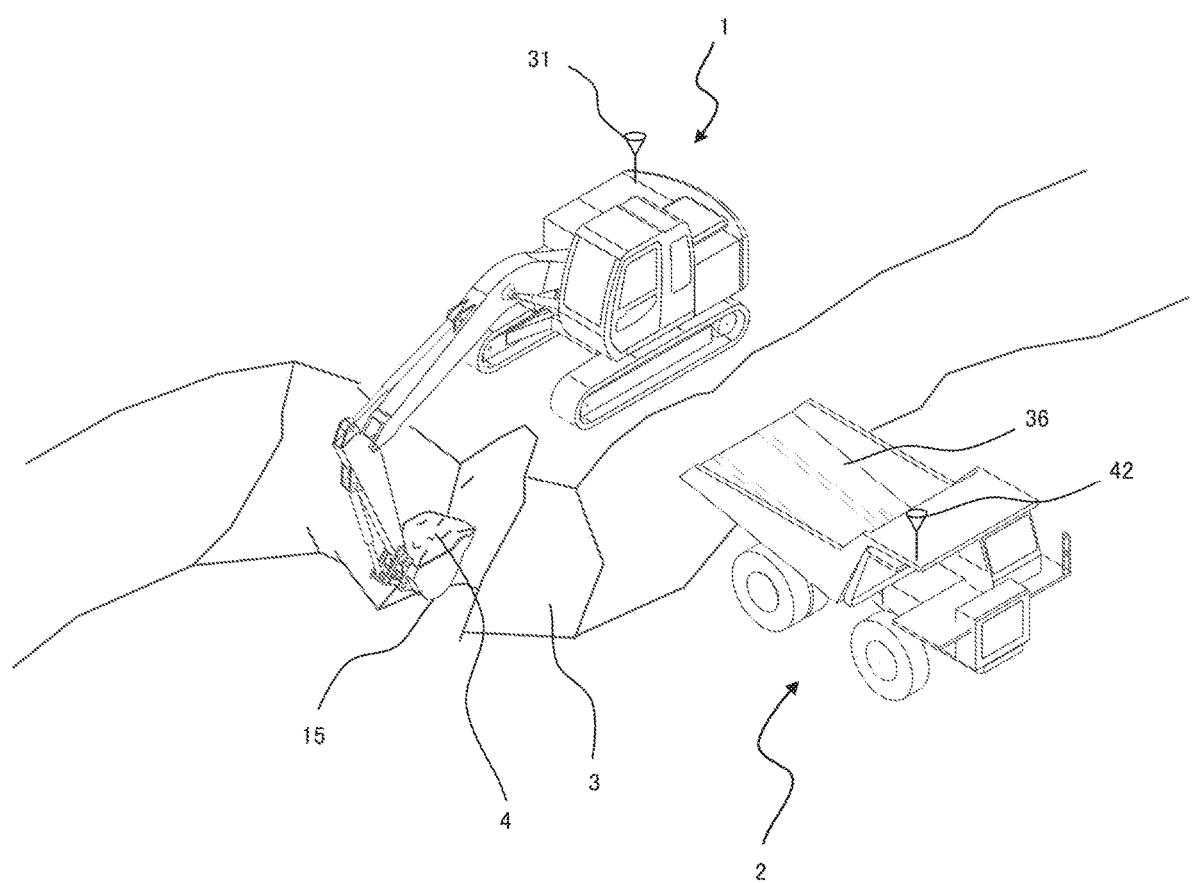
FIG. 3 is an external view depicting an example of operation of a hydraulic excavator 1 during a loading work.
Figure 4:
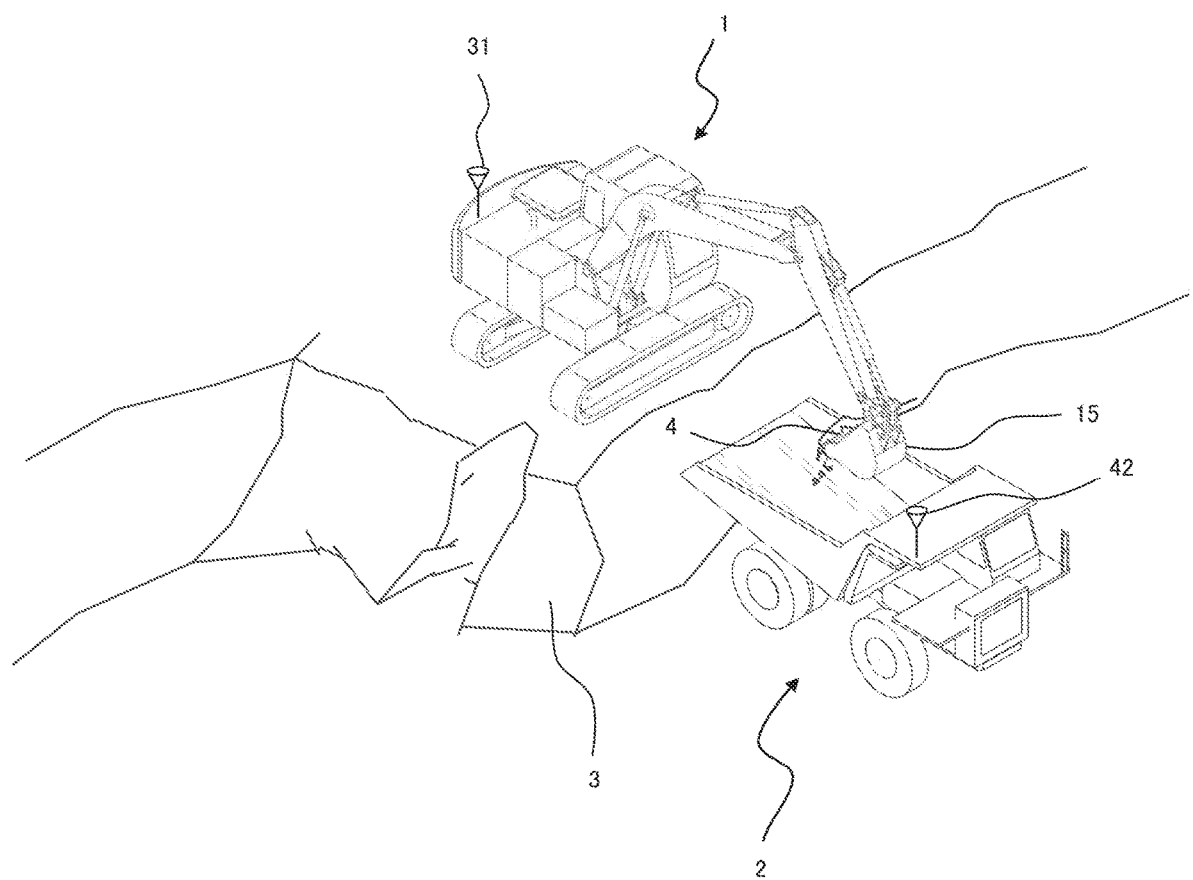
FIG. 4 is an external view depicting an example of operation of the hydraulic excavator 1 during the loading work.

FIGS. 3 and 4 are external views depicting an example of motion of the hydraulic excavator 1 during a loading work. The hydraulic excavator 1 of FIG. 3 is performing an "excavating motion" of excavating the object to be worked (the object to be excavated) 3 and loading the object to be worked 4 into the bucket 15, and the hydraulic excavator 1 of FIG. 4 is performing a "loading operation" of releasing the object to be worked 4 in the bucket 15 onto the cargo bed 36 of the dump truck 2.

<System Configuration of Load Measurement>

Figure 5:
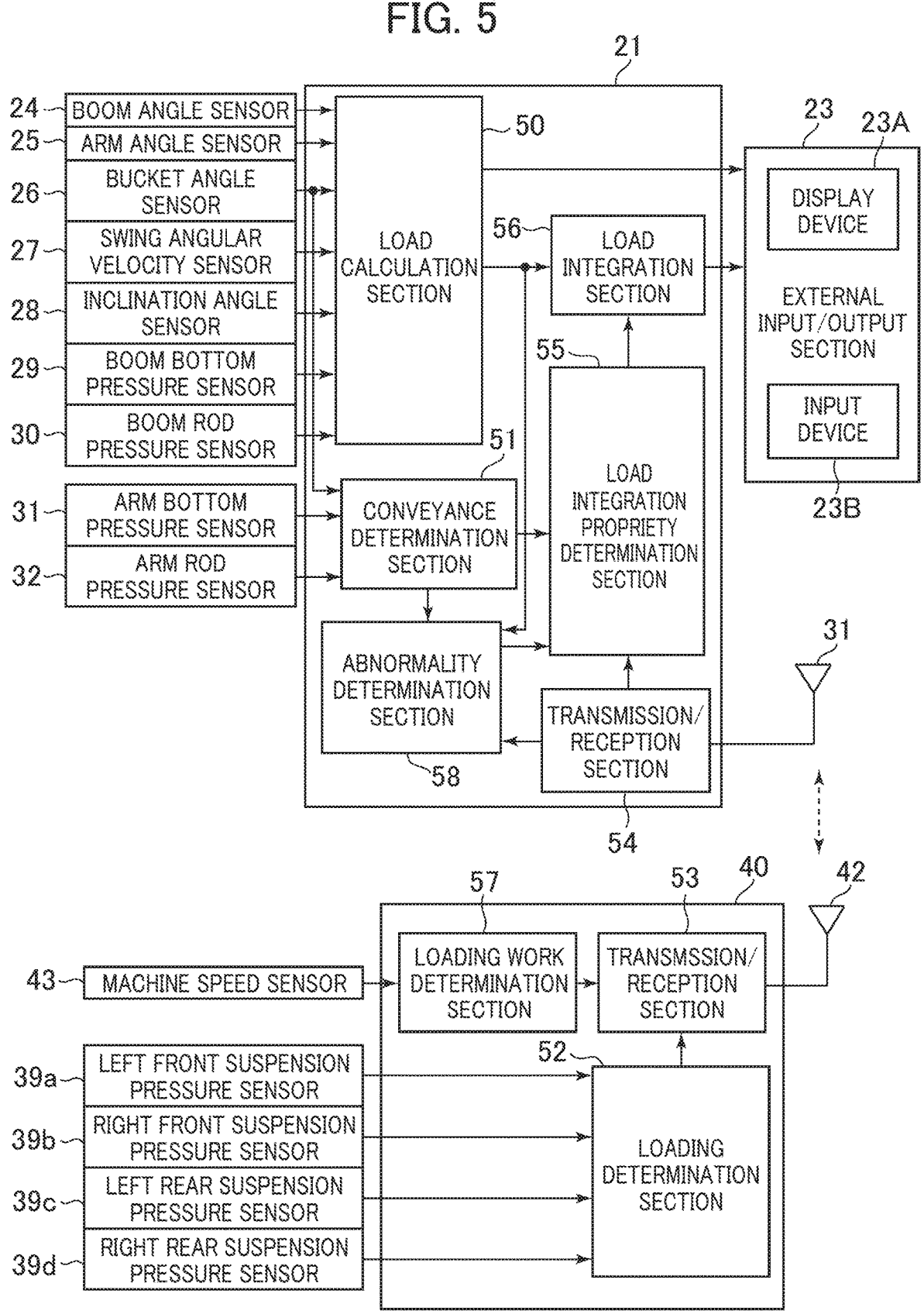
FIG. 5 is a system configuration diagram of a load measuring system according to the embodiment of the present invention.

FIG. 5 is a system configuration diagram of a load measuring system in the present embodiment, in which respective functions are depicted in block diagrams in the inside of the controller 40 and the controller 21.

The controller 40 on the dump truck 2 side receives inputs of signals from the suspension pressure sensors 39a, 39b, 39c and 39d and the machine speed sensor 43, and is configured such that information (for example, loading determination and loading work determination which will be described later) computed based on these signals can be transmitted to the controller 21 on the excavator side through the wireless transceiver 42.

In addition, the controller 40 functions as: a loading determination section 52 that determines whether or not the loading of the object to be worked onto the dump truck 2 (throwing of the object to be worked onto the cargo bed 36) by the hydraulic excavator 1 has been conducted based on the weight of the object to be worked calculated from detection values outputted from the suspension pressure sensors 39a, 39b, 39c and 39d; a loading work determination section 57 that determines whether or not the dump truck 2 is under the loading work of loading the object to be worked by the hydraulic excavator 1 based on the speed of the dump truck 2 calculated by a detection value outputted by the machine speed sensor 43; and a transmission/reception section 53 that controls transmission/reception of information (for example, results of determination by the loading determination section 52 and the loading work determination section 57) through the wireless transceiver 42.

The controller 21 on the hydraulic excavator 1 side is configured to be able to receive, as inputs, outputs of the angle sensors 24 to 28 and the pressure sensors 29 to 32, reception signals of the wireless transceiver 33, and information inputted from the input device 23B, to calculate information (for example, the loading amount onto the hauling machine 2) computed based on the inputs, display the information on the display device 23A, or to transmit the information to the controller 40 on the dump truck side through the wireless transceiver 33.

In addition, the controller 21 functions as: a conveyance determination section 51 that determines whether or not the loading of the object to be worked onto the dump truck 2 by the hydraulic excavator 1 has been conducted based on a detection value at the bucket angle sensor 26 indicating the posture of the front work implement 12 and detection values at the arm bottom pressure sensor 31 and the arm rod pressure sensor 32 indicating a load on the arm cylinder 17; a load calculation section 50 that calculates the load (first load) of the object to be worked in the bucket 15 concerning the loading of the object to be worked onto the dump truck 2 by the hydraulic excavator 1 based on a thrust force of the boom cylinder 16 calculated from detection values at the boom bottom pressure sensor 29 and the boom rod pressure sensor 30; a transmission/reception section 54 that controls transmission and reception of information (for example, results of determination by the loading determination section 52 and the loading work determination section 57) through the wireless transceiver 33; an abnormality determination section 58 that determines presence or absence of an abnormality in a load measuring system based on results of determination by the conveyance determination section 51, the loading determination section 52 and the loading work determination section 57, detection values outputted by the suspension pressure sensors 39a, 39b, 39c and 39d and the like; a load integration propriety determination section 55 that determines whether or not the load calculated by the load calculation section 50 is to be integrated based on results of determination by the conveyance determination section 51 and the loading determination section 52; and a load integration section 56 that calculates the load loaded on the dump truck 2 by integrating the load when it is determined by the load integration propriety determination section 55 that the load (first load) calculated by the load calculation section 50 is to be integrated, and that outputs a display based on the calculation results to the display device 23A.

Next, a method of calculating the load loaded on the dump truck 2 by integrating the load in the bucket 15 based on the determination results of both the conveyance determination in the hydraulic excavator 1 and the loading determination in the dump truck 2 by the load measuring system according to the present embodiment will be described below, using FIGS. 6 to 15.

<Loading Work Determining Method by Loading Work Determination Section 57>

Figure 6:
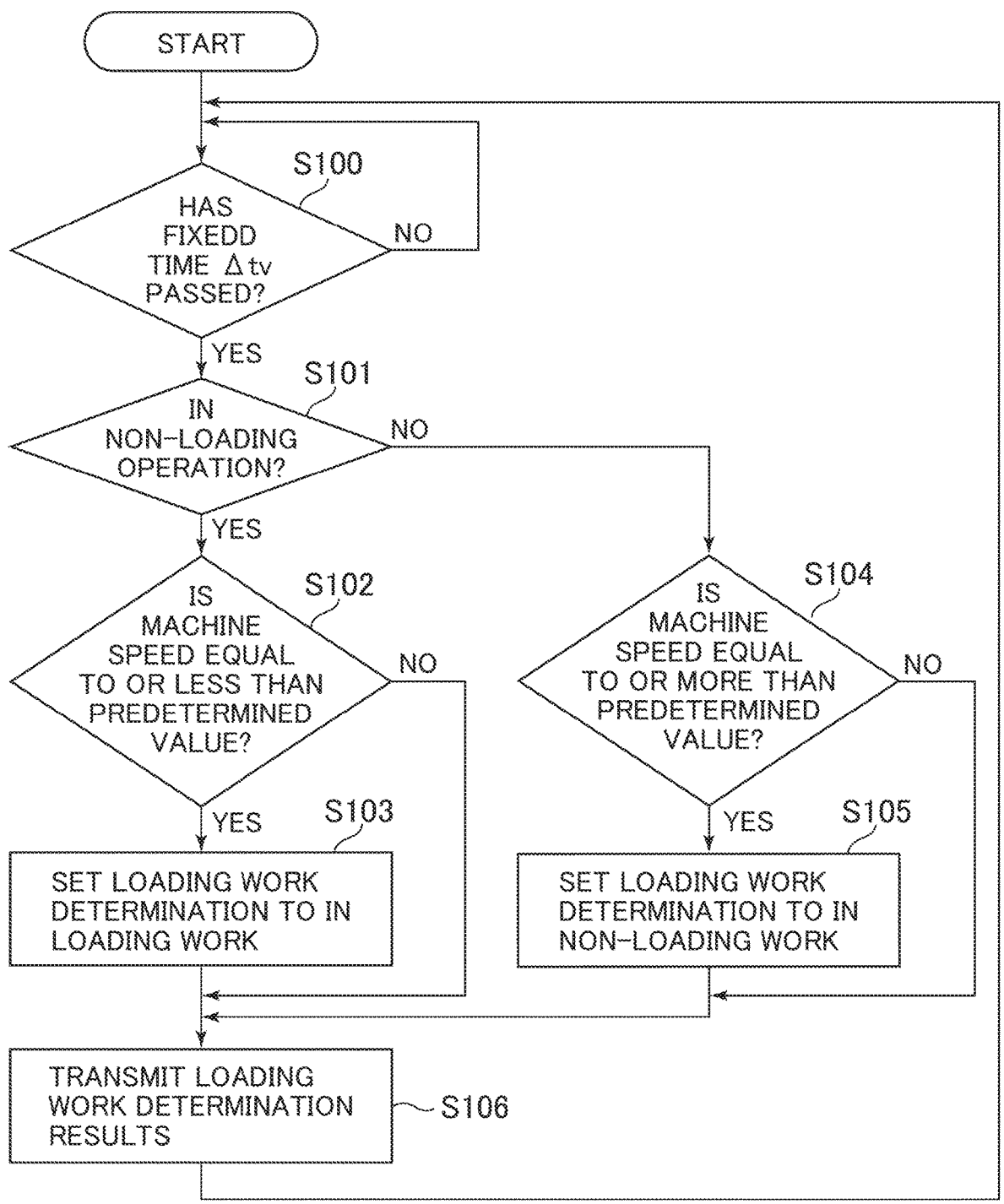
FIG. 6 is a flow chart depicting a method of determining whether or not a dump truck 2 is under a loading work, by a controller 40 on the dump truck 2 side.
Figure 7:
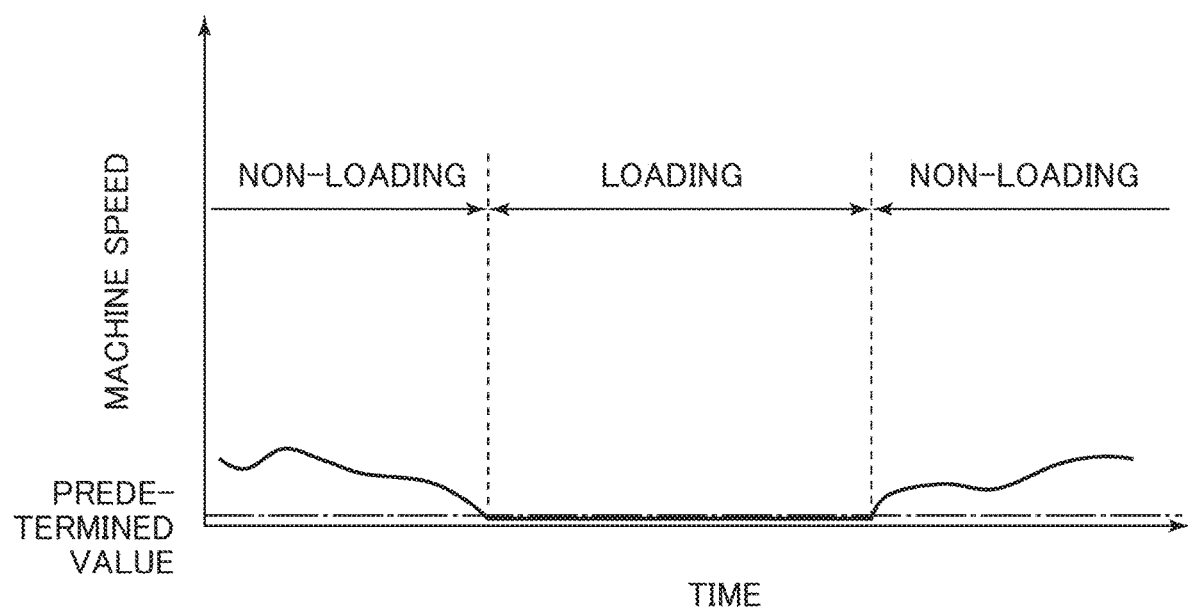
FIG. 7 is an example of graph depicting the relation between a detected value at a machine speed sensor 43 and result of determination by a loading work determination section 57.

FIG. 6 is a flow chart depicting a method (sixth determination) of determining whether or not the dump truck 2 is under a loading work by the loading work determination section 57 in the controller 40 on the dump truck 2 side, and FIG. 7 is an example of graph depicting the relation between a detection value at the machine speed sensor 43 and the result of determination by the loading work determination section 57.

The flow chart of FIG. 6 is executed every predetermined sampling period in the controller 40 on the dump truck 2.

The loading work determination section 57 first determines whether or not a fixed time Δtv has passed from the time of start of the flow chart, in step S100. When it is determined that the fixed time Δtv has not passed, the control returns to before execution of step S100, and continues monitoring time passage in step S100. On the other hand, when it is determined that the fixed time Δtv has passed, the control proceeds to step S101.

In step S101, it is determined whether or not the loading work determination is in non-loading work. The loading work determination includes "in loading work" that indicates that the dump truck 2 is under a loading work together with the hydraulic excavator 1, and "in non-loading work" that indicates that the dump truck 2 is not under a loading work (for example, it is in traveling). The loading work determination is set in steps S103 and S105 described later. A default value (a value at the time of start of the flow of FIG. 6) for the loading work determination is in non-loading work. When the loading work determination in step S101 is in non-loading work (in the case of YES), the control goes to step S102. In contrast, when the loading work is in loading work (in the case of NO), the control goes to step S104.

In step S102, it is determined whether or not the machine speed (traveling speed) of the dump truck 2 is equal to or less than a predetermined value, based on an output from the machine speed sensor 43. The predetermined value here is a value by which it can be determined whether or not the dump truck 2 is at stoppage, and can be set at, for example, 1 km/h. When the machine speed is equal to or less than the predetermined value, the loading work determination is set in step S103 to be in loading work, after which the control goes to step S106. On the other hand, when the machine speed exceeds the predetermined value, the processing in step S103 is skipped, and the control goes to step S106. As depicted in FIG. 7, in a case where the machine speed is lowered to or below the predetermined value during when the loading work determination is set to be "in non-loading work," the dump truck 2 is deemed as being at stoppage for a loading work, and the loading work determination is changed to "in loading work."

In step S104, it is determined whether or not the machine speed of the dump truck 2 is equal to or more than a predetermined value, based on an output from the machine speed sensor 43. The predetermined value here is the same as the predetermined value in step S102, and is a value by which it can be determined whether or not the dump truck 2 is at stoppage. When the machine speed is equal to or more than the predetermined value, the loading work determination is set to be in non-loading work in step S105, after which the control goes to step S106. On the other hand, when the machine speed is less than the predetermined value, the processing in step S105 is skipped, and the control goes to step S106. As depicted in FIG. 7, in a case where the machine speed is raised to or above the predetermined value during when the loading work determination is set to be "loading work," it is deemed that the loading work is finished and the dump truck 2 has started traveling, and the loading work determination is changed to "in non-loading work."

Finally, the loading work determination section 57 outputs the result of the loading work determination of the dump truck 2 (whether the dump truck 2 is in loading work or in non-loading work) to the transmission/reception section 53 in step S106, and the transmission/reception section 53 transmits it to the hydraulic excavator 1 through the wireless transceiver 42. When the processing in step S106 is finished, the control returned to before step S100, and the loading work determination section 57 monitors whether a predetermined time has passed from the time of finish of step S106, in step S100.

Note that a flow chart may be configured such that the control goes to step S103 or step S105 and the loading work determination is changed only when a machine speed satisfying a condition has continued for a predetermined time in step S102 or step S104.

<Loading Determination Method by Loading Determination Section 52>

Figure 8:
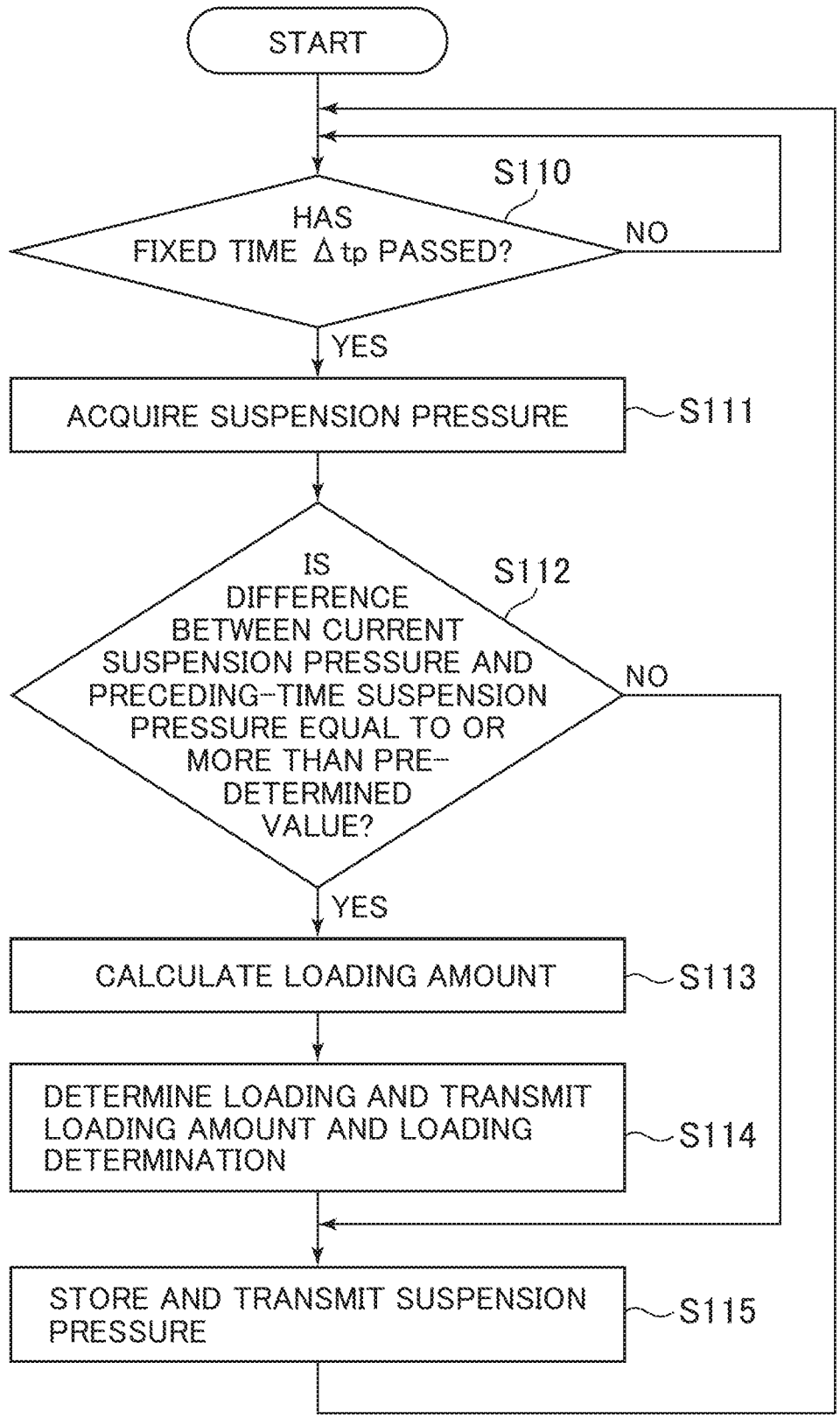
FIG. 8 is a flow chart depicting a method of determining whether or not the loading of an object to be worked onto the dump truck 2 by the hydraulic excavator 1 has been conducted, by the controller 40 on the dump truck 2 side.
Figure 9:
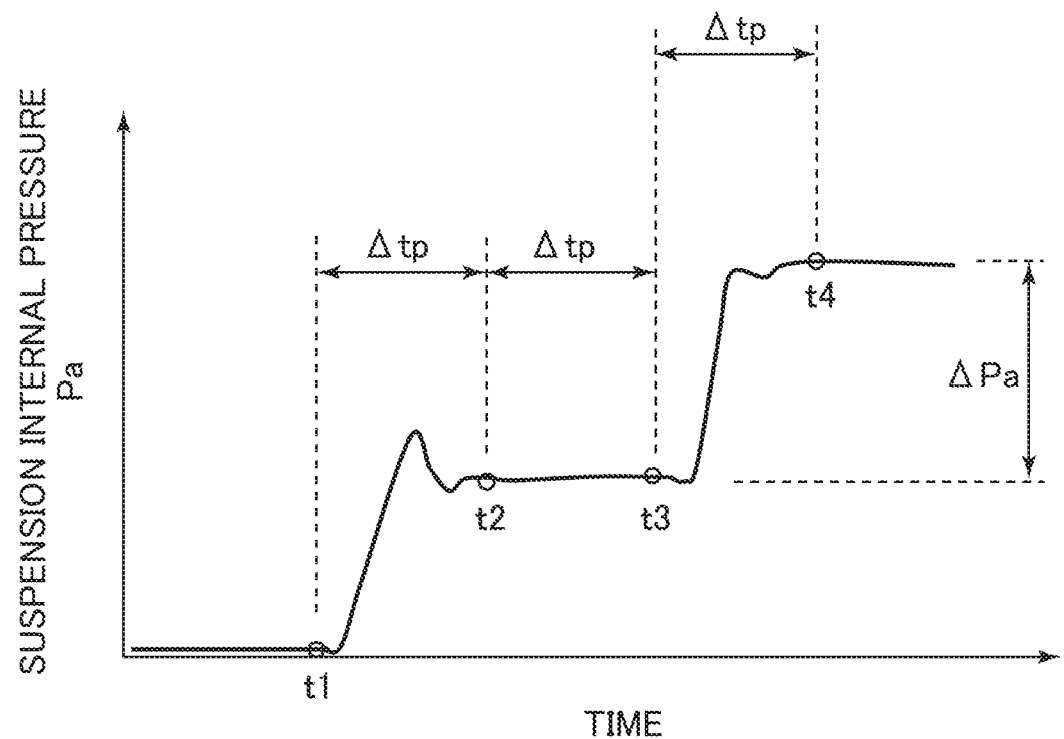
FIG. 9 is a graph depicting an example of time variation of a detected value at a suspension pressure sensor 39a of the dump truck 2 under a loading work.

FIG. 8 is a flow chart depicting a method (second determination) of determining whether or not the loading of the object to be worked onto the dump truck 2 by the hydraulic excavator 1, by the loading determination section 52 in the controller 40 on the dump truck 2 side. FIG. 9 is a graph depicting an example of time variation of a detection value at the suspension pressure sensor 39a of the dump truck 2 under a loading work.

Each step in FIG. 8 is executed every predetermined sampling period in the controller 40 of the dump truck 2.

The loading determination section 52 first determines, in step S110, whether or not a fixed time Δtp has passed from the time of start of the flow chart; when it is determined that the fixed time Δtp has not passed, the control goes to before execution of step S110, and monitoring of passed time is continued in step S110. On the other hand, when it is determined that the fixed time Δtp has passed, the control proceeds to step S111.

In step S111, pressure values outputted from the four suspension pressure sensors 39a to 39d are acquired.

In step S112, differences ΔP between the pressure values obtained in step S111 by the suspension pressure sensors 39a to 39d and preceding-time pressure values are computed, and it is determined whether or not any one of the four differences is equal to or more than a predetermined value. The "preceding-time pressures" here means the pressure values acquired in step S111 before one control period (before Δtp) and stored in step S115. The predetermined value here is a value by which it can be determined whether or not the object to be worked has been thrown onto the cargo bed 36 of the dump truck 2, and can be set to, for example, a pressure value increased by the weight of the object to be worked equal to one half of the bucket capacity. When the object to be worked is thrown onto the cargo bed of the dump truck 2, the pressures of the suspensions 38a to 38d are raised as indicated in section of t1 to t2 and section of t3 to t4 in FIG. 9. Note that in FIG. 8, only the variation in the pressure concerning the suspension 38a is depicted, for simplification of explanation, and the suffixes in the subsequent description correspond to the suspensions 38a to 38d. In step S112, when any one of the four differences ΔPa to ΔPd is equal to or more than the predetermined value, it is determined that the object to be worked has been thrown onto the cargo bed 36, and the control proceeds to step S113. If not so, the control proceeds to step S115.

In step S113, the loading determination section 52 calculates the weight (loaded amount) M (second load) of the object to be worked that is thrown in. Let inside diameters of the suspensions 38a to 38d be Aa to Ad and let the gravitational acceleration be g, then the weight M (second load) of the object to be worked is represented by the following formula (1).

$$M=(Aa \cdot \Delta Pa+Ab \cdot \Delta Pb+Ac \cdot \Delta Pc+Ad \cdot \Delta Pd)/g \quad (1)$$

After the loaded amount M is calculated in step S113, the loading determination section 52 determines (loading determination) that the loading of the object to be worked onto the dump truck 2 by the hydraulic excavator 1 has been conducted, in step S114, while the transmission/reception section 53 transmits the determination result (loading determination) and the loaded amount M to the controller 21 on the hydraulic excavator 1 side through the wireless transceiver 42, and the control proceeds to step S115.

In step S115, the loading determination section 52 stores the suspension pressures acquired in step S111 this time as the preceding-time suspension pressures for calculation in step S112 next time, and the transmission/reception section 53 transmits the suspension pressures to the controller 21 on the hydraulic excavator 1 side through the wireless transceiver 42. Thereafter, the control returns to before step S110, and the loading determination section 52 stands by until the fixed time Δtp passes again.

<Conveyance Determining Method by Conveyance Determination Section 51>

Figure 10:
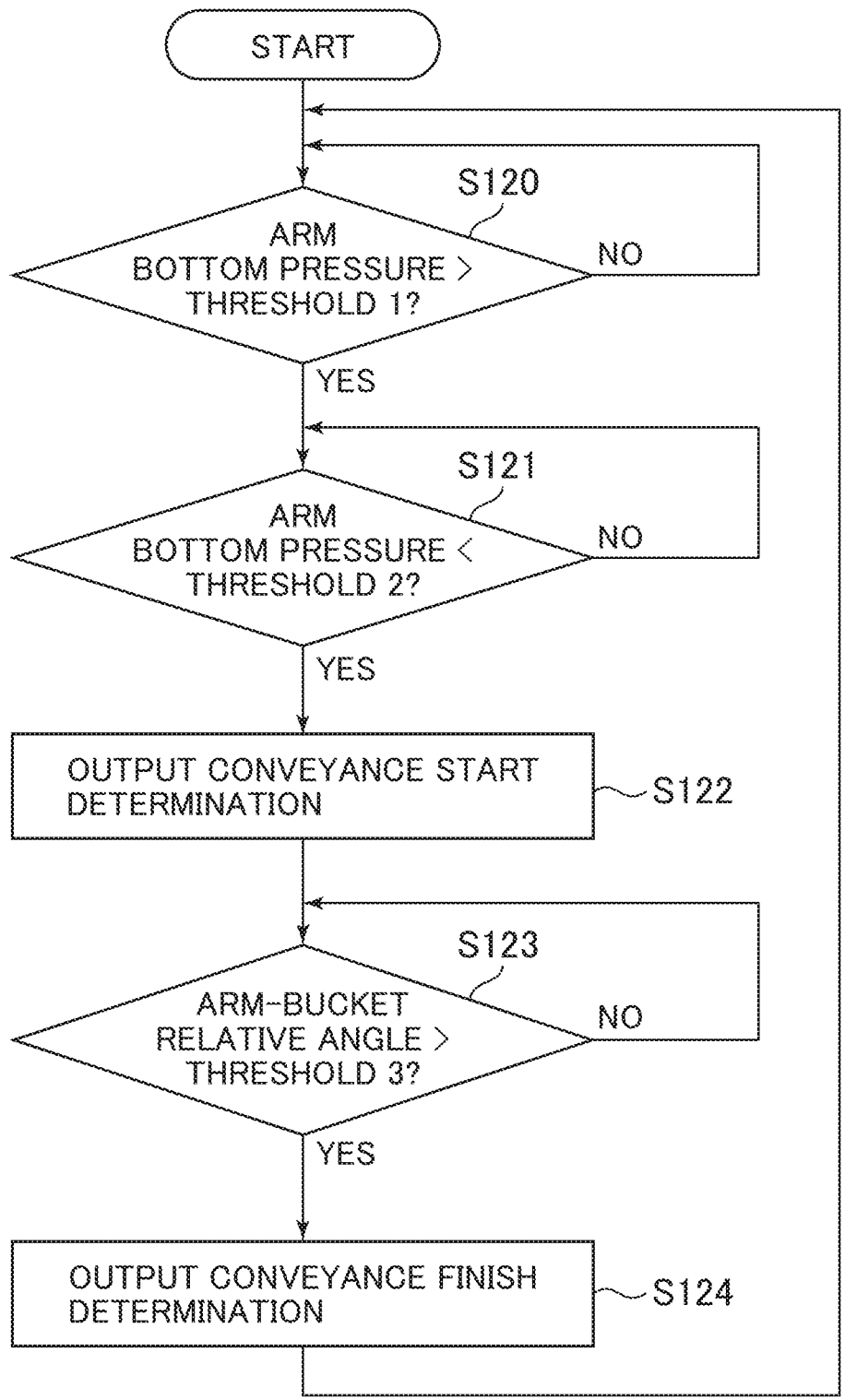
FIG. 10 is a flow chart depicting a method of determining whether or not the loading of the object to be worked onto the dump truck 2 by the hydraulic excavator 1 has been conducted, by a controller 21 on the hydraulic excavator 1 side.
Figure 11:
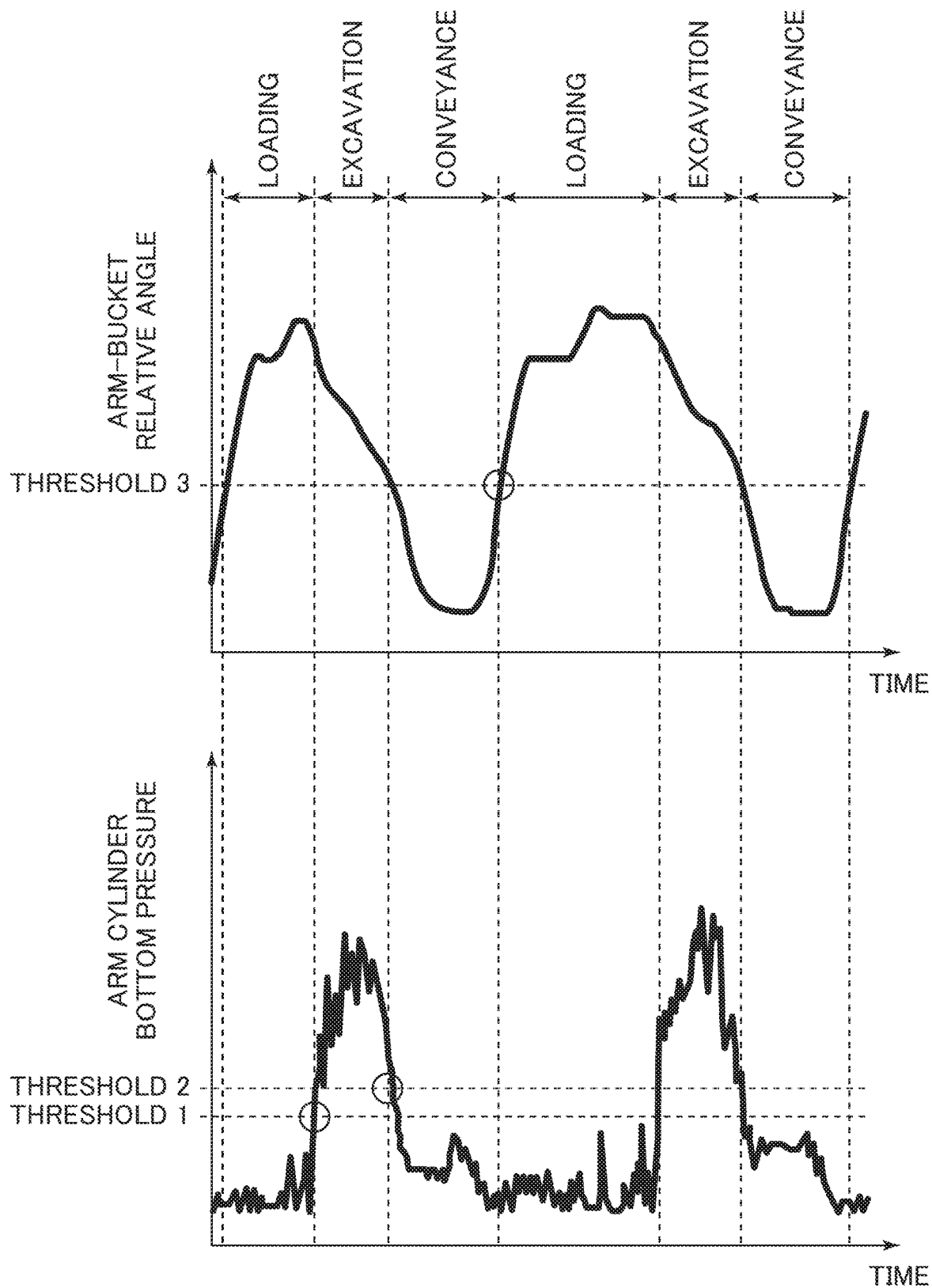
FIG. 11 is an example of graph depicting the relation between a detected value at an arm bottom pressure sensor 31 and a detected value at a bucket angle sensor 26 and result of detection by a conveyance determination section 51.

FIG. 10 is a flow chart depicting a method (first determination) of determining whether or not the loading of the object to be worked onto the dump truck 2 by the hydraulic excavator 1 has been conducted, by the conveyance determination section 51 in the controller 21 on the hydraulic excavator 1 side. FIG. 11 is an example of graph depicting the relation between a detection value at the arm bottom pressure sensor 31 (arm cylinder bottom pressure) and a detection value at the bucket angle sensor 26 (arm-bucket relative angle) and the result of determination by the conveyance determination section 51.

The flow chart of FIG. 10 is executed every predetermined sampling period in the controller 21 of the hydraulic excavator 1.

The conveyance determination section 51 monitors an output of the arm bottom pressure sensor 31, and determines whether or not the output has exceeded a preset threshold 1 from the state of being below the threshold 1, in step S120. Since the hydraulic excavator 1 performs excavation by pushing out the arm cylinder 17, the arm cylinder bottom pressure increases during an excavating motion, as depicted in the graph on the lower side in FIG. 11. In the present embodiment, therefore, the excavating motion is deemed as being started at the timing when the arm bottom pressure exceeds the threshold 1. When it is determined in step S120 that the arm bottom pressure has exceeded the threshold 1 from the state of being below the threshold 1, the conveyance determination section 51 determines that the hydraulic excavator 1 has started an excavating motion, and the control proceeds to step S121. In contrast, when the arm bottom pressure does not exceed the threshold 1 from the state of being below the threshold 1 (when it remains equal to or less than the threshold 1), the control returns to before step S120, and monitoring of the output of the arm bottom pressure sensor 31 is continued.

In step S121, continued monitoring of the output of the arm bottom pressure sensor 31 is conducted, and it is determined whether or not the output has decreased below a preset threshold 2 from the state of being above the threshold 2. Since the arm cylinder bottom pressure decreases when an excavating motion is finished as depicted in the graph on the lower side in FIG. 11, in the present embodiment the excavating motion is deemed as finished and the conveying motion is deemed as started, at the timing when the arm bottom pressure decreases below the threshold 2. When it is determined in step S121 that the arm bottom pressure has decreased below the threshold 2 from the state of being above the threshold 2, the conveyance determination section 51 determines that the hydraulic excavator 1 has finished the excavating motion and that the conveying motion is started (fourth determination (No. 1)), and the control proceeds to step S122. In contrast, when the arm bottom pressure does not decease below the threshold 2 from the state of being above the threshold 2 (when it remains equal to or more than the threshold 2), the conveyance determination section 51 determines that the excavating motion is being continued, and the control returns to before step S121, to continue monitoring the output of the arm bottom pressure sensor 31.

Note that as for the relation between the threshold 1 and the threshold 2, the relation of threshold 1<threshold 2 is established in the example depicted in FIG. 11, but this is merely an example. Arbitrary threshold values can be set in such a range that the start and finish of an excavating motion of the hydraulic excavator 1 can be determined. Besides, in this case, the relation in magnitude between the threshold 1 and the threshold 2 does not matter.

In step S122, the conveyance determination section 51 outputs to the exterior a determination that a conveying motion has been started, and the control proceeds to step S123. The destinations to which this determination is outputted include the load integration propriety determination section 55.

In step S123, the conveyance determination section 51 monitors an output of the bucket angle sensor 26, and determines whether or not an arm-bucket relative angle (the angle formed between the arm 14 and the bucket 15) has exceeded a preset threshold 3. The hydraulic excavator 1 having finished the conveying motion and starting the loading operation operates such as to widen the angle formed between the arm 14 and the bucket 15 in order to release the earth and sand (the object to be excavated) in the bucket 15. Specifically, as depicted in the graph on the upper side in FIG. 11, the relative angle between the arm 14 and the bucket 15 increases at the time of transition from the conveying motion to the loading operation. In the present embodiment, therefore, the conveying motion is deemed as finished and the loading operation is deemed as started at the timing when the relative angle between the arm 14 and the bucket 15 exceeds the threshold 3. When it is determined in step S123 that the arm-bucket relative angle has exceeded the threshold 3, the conveyance determination section 51 determines that the hydraulic excavator 1 has finished the conveying motion and has started the loading operation (fourth determination (No. 2)), and the control proceeds to step S124. On the other hand, when it is determined that the arm-bucket relative angle does not exceed the threshold 3 (when it remains equal to or less than the threshold 3), the conveyance determination section 51 determined that the conveying motion is being continued, and the control returns to before step S123, to continue monitoring the output of the bucket angle sensor 26.

In step S124, the conveyance determination section 51 outputs to the exterior a determination that the conveying motion has been finished (a determination that the loading operation has been started), and the control returns to step S120. The destinations to which this determination is outputted include the load integration propriety determination section 55 and the abnormality determination section 58.

<Abnormality Determining Method by Abnormality Determination Section 58>

Figure 12:
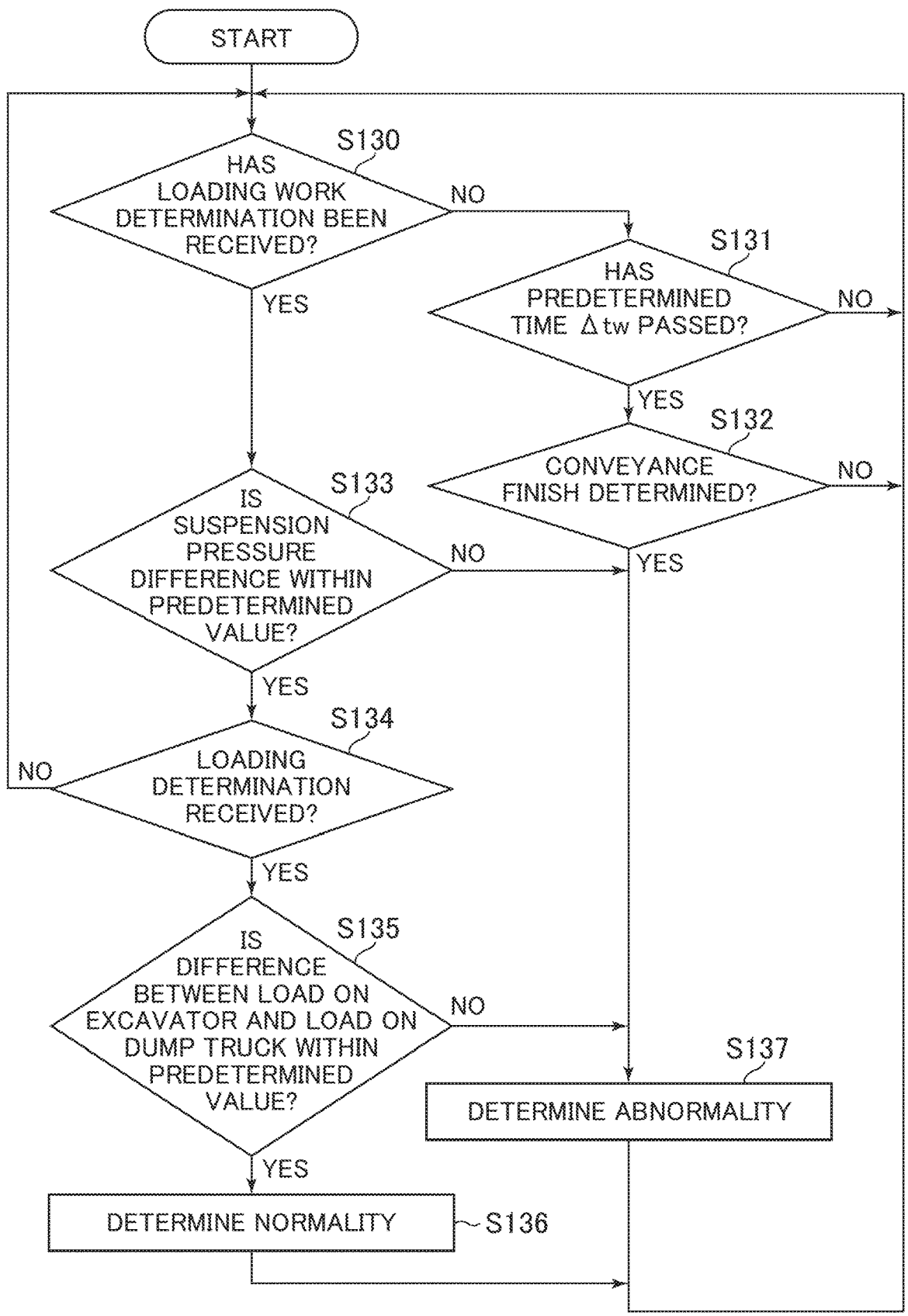
FIG. 12 is a flow chart depicting a method of determining presence or absence of an abnormality in the load measuring system of the present embodiment, by the controller 21 on the hydraulic excavator 1 side.

FIG. 12 is a flow chart depicting a method (fifth determination) of determining presence or absence of an abnormality in the load measuring system according to the present embodiment, by the abnormality determination section 58 in the controller 21 on the hydraulic excavator 1 side.

The flow chart of FIG. 12 is executed every predetermined sampling period in the controller 21 of the hydraulic excavator 1.

First, in step S130, the abnormality determination section 58 determines whether or not the loading work determination (the result of the loading work determination transmitted in step S106 of FIG. 6) received from the dump truck 2 is set to the loading work. When the loading work determination is set to "loading work," the control proceeds to step S133, whereas when the loading work determination is set to "non-loading work," the control proceeds to step S131.

In step S131, the abnormality determination section 58 determines whether or not a predetermined time Δtw has passed from the time of start of the flow chart, and checks if a state of no reception of the result of the loading work determination is being continued. The predetermined time Δtw here is a time of equal to or more than the execution period of the flow chart of FIG. 6 by the loading work determination section 57, that is, a time of equal to or more than the fixed time Δtv in step S100 of FIG. 6. Note that the value of Δtw is preferably a value in the range from Δtv to two times Δtv. The controller 40 of the dump truck 2 transmits the result of the loading work determination at the fixed period Δtv, as depicted in FIG. 6. If reception of the result of the loading work determination is absent even when the fixed period Δtv has passed, therefore, communication with the controller 40 of the dump truck 2 may not be being performed. When it is determined in step S131 that the predetermined time Δtw has not passed, the control returns to before step S130, and the presence or absence of reception of the loading work determination is again monitored in step S130. On the other hand, when it is determined that the predetermined time Δtw has passed, the control proceeds to step S132.

In step S132, it is determined whether or not it has been determined in the conveyance determination section 51 that the hydraulic excavator 1 has finished the conveying motion. Here, when the determination of the finish of the conveying motion is absent, the control returns to before step S130, and whether there is reception of the result of the loading work determination is again monitored in step S130. On the other hand, when the determination of the finish of the conveying motion is present, the control proceeds to step S137, where it is determined that an abnormality is present in the system and an abnormality determination is outputted. In this way, in a case where the result of loading work determination could not been received for the predetermined period Δtw in step S131 and where it is determined in step S132 that the hydraulic excavator 1 has finished conveyance, it can be decided that the hydraulic excavator 1 is conducting loading onto the dump truck 2 but communication is not established between them. In other words, when determination at step S132 is YES, it can be decided that an abnormality in communication relation is present. Note that start of a loading operation may be determined in step S132 in place of finish of the conveying motion.

When loading work determination is set to "in loading work" in step S130, whether or not there is an abnormality in the output values of the suspension pressure sensors 39a to 39d transmitted from the controller 40 of the dump truck 2 in step S115 of FIG. 8 is determined in step S133 (fifth determination). Specifically, from the output values of the suspension pressure sensors 39a to 39d indicative of the weight of the object to be worked loaded on the dump truck 2, an average value of the pressure values of the four suspensions is computed, then differences of the four pressure values from the average value are computed, and, if all the four differences are within a predetermined value, it is deemed that no abnormality is present in the suspension pressure sensors 39a to 39d, and the control proceeds to step S134. On the other hand, if any one of the four differences is equal to or more than a predetermined value, it is determined that an abnormality is present in the system. When any one of the suspension pressure sensors 39a to 39d is troubled, the pressure value is not outputted normally, and the difference between the output value of the troubled sensor and that of the non-troubled sensor is enlarged. Therefore, in a case where determination at step S133 is NO, it can be decided that one or some of the pressure sensors 39a to 39d may be troubled.

In step S134, the abnormality determination section 58 determines whether or not a determination that the loading of the object to be worked onto the dump truck 2 by the hydraulic excavator 1 has been conducted (the loading determination transmitted in step S114 of FIG. 8) has been received from the controller 40 of the dump truck 2. When it is determined that the loading determination has been received, the control proceeds to step S135, and, if not so, the control returns to before step S130, to again monitor whether or not the loading determination has been received.

In step S135, a load value (first load) of the object to be worked in the bucket 15 outputted from the load calculation section 50 in step S146 of FIG. 14 to be described later and a loaded amount M (second load) outputted from the loading determination section 52 in step S114 of FIG. 8 are compared with each other, and it is determined whether or not the difference (weight difference) between them is within a predetermined value. When the weight difference is within the predetermined value, it is determined in step S136 that the system is normal. On the other hand, when the weight difference exceeds the predetermined value, it is determined in step S137 that an abnormality is present in the system. In this way, when decision at step S135 is NO, it can be decided that a trouble may have been generated in either of the load calculation section 50 of the hydraulic excavator 1 and the loading determination section 52 of the dump truck 2.

Note that the determination result of the system abnormality based on the flow chart of FIG. 12 is stored inside the controller 21 on the hydraulic excavator 1 side, and is referred to, as required, by the controller 21 itself or other devices or computers. Even in a case where abnormality determination is once made in step S137, if the control proceeds to step S136 due to a change-over of the dump truck 2 or the like, a determination result that the system is normal is stored.

<Instantaneous Load Calculating Method for Object to be Worked by Load Calculation Section 50>

Figure 13:
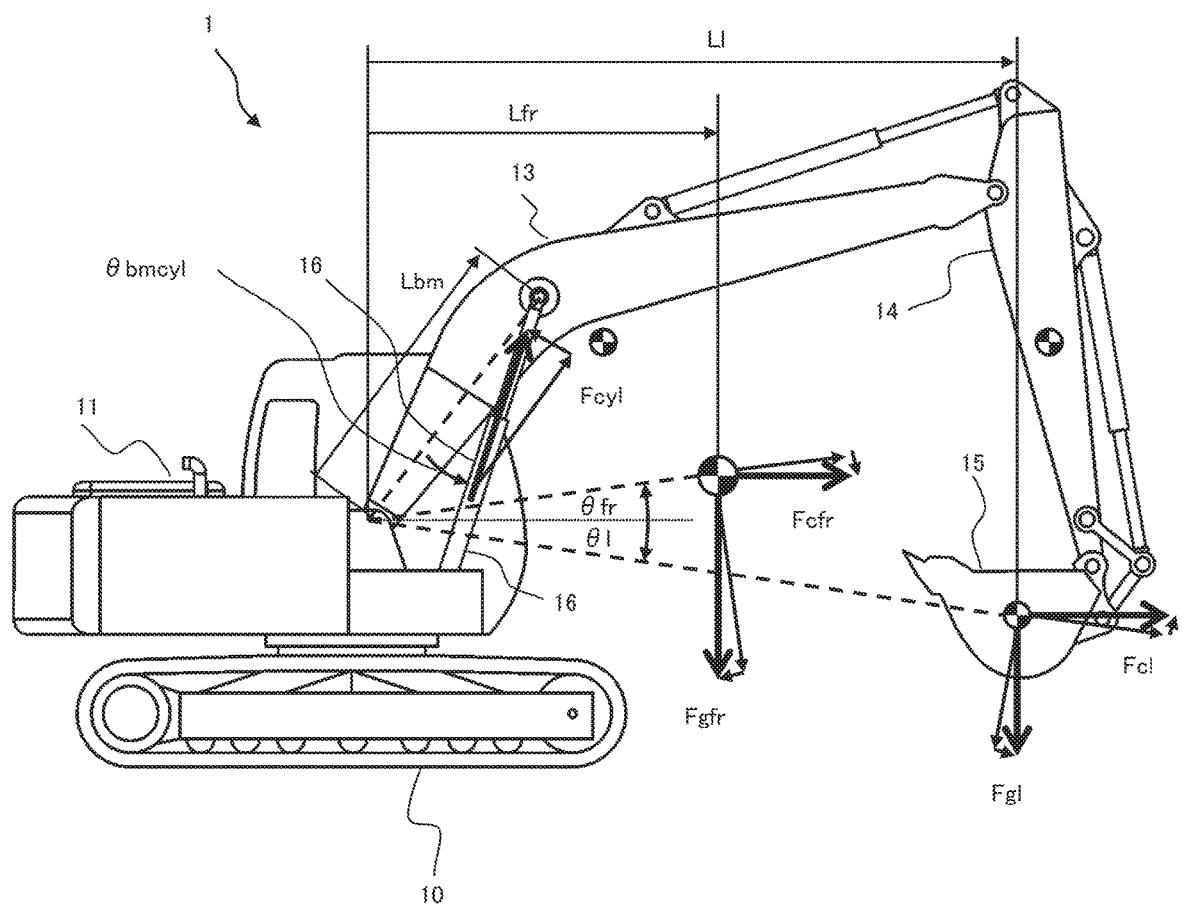
FIG. 13 is an illustration of a calculating method for instantaneous load M1 of the object to be worked in a bucket 15, by the controller 21 on the hydraulic excavator 1 side.

FIG. 13 is an illustration of a calculating method for an instantaneous load M1 of the object to be worked in the bucket 15 by the load calculation section 50 in the controller 21 on the hydraulic excavator 1 side. In the present embodiment, the load is computed by utilizing the balance between a torque acting around a rotational axis of the boom 13 which torque is generated by the boom cylinder 16, a torque generated by the front work implement 12 due to gravity and a swing centrifugal force, and a torque generated by the object to be worked due to gravity and a swing centrifugal force.

A thrust force Fcyl of the boom cylinder 16 is computed by multiplying an output signal of the boom bottom pressure sensor 29 and an output signal of the boom rod pressure sensor 30 by a pressure receiving area of the boom cylinder 16, and then obtaining the difference between the products. A torque Tbm generated by the boom cylinder 16 is computed from the following formula (2), where Lbm is the length of a line segment interconnecting a boom rotational axis and a working point of the thrust force Fcyl of the boom cylinder 16, and θbmcyl is an angle formed between the thrust force Fcyl of the boom cylinder 16 and the line segment Lbm and the direction of the thrust force.

$$Tbm = Fcyl \cdot Lbm \cdot \sin(\theta bmcyl) \quad (2)$$

A torque Tgfr generated by the front work implement 12 due to gravity is computed by the following formula (3), where Mfr is the center-of-gravity weight of the front work implement 12, g is the gravitational acceleration, and Lfr is the length in the front-rear direction from the rotational axis of the boom to the center of gravity of the front work implement.

$$Tgfr = Mfr \cdot g \cdot Lfr \quad (3)$$

A torque Tcfr generated by the front work implement 12 due to a swing centrifugal force is computed by the following formula (4), where ω is the swing angular velocity, and θfr is the angle formed between a line segment interconnecting the boom rotational axis and the center of gravity of the front work implement and a horizontal plane.

$$Tcfr = Mfr \cdot Lfr \cdot \omega 2 \cdot \sin(\theta fr) \quad (4)$$

Note that Mfr, Lfr, and θfr are computed from the respective center-of-gravity positions and weights of the boom 13, the arm 14 and the bucket 15 that are preset and the angle signals outputted from the boom angle sensor 24, the arm angle sensor 25, the bucket angle sensor 26 and the inclination angle sensor 28.

A torque Tg1 generated by the object to be worked due to gravity is computed by the following formula (5), where M1 is the instantaneous load of the object to be worked, and L1 is the length in the front-rear direction from the rotational axis of the boom to the center of gravity of the bucket.

$$Tg1 = M1 \cdot g \cdot L1 \quad (5)$$

A torque Tc1 generated by the object to be worked due to the swing centrifugal force is computed by the following formula (6), where θ1 is the angle formed between a line segment interconnecting the rotational axis of the boom and the center of gravity of the object to be worked and a horizontal plane.

$$Tc1 = M1 \cdot L1 \cdot \omega 2 \cdot \sin(\theta 1) \quad (6)$$

When the balance from the formula (1) to the formula (5) is modified and the formulas are developed with respect to the instantaneous load M1 of the object to be worked, the instantaneous load M1 is computed by the following formula (7).

$$M1 = (Tbm - Tgfr - Tcfr)/(L1 \cdot (g + \omega 2 \cdot \sin(\theta 1))) \quad (7)$$

The calculations of the load by the formulas (2) to (8) cannot always output a fixed value during conveyance due to the sensor noises and the characteristics of the hydraulic circuit; therefore, the instantaneous load M1 computed in a predetermined period during when the hydraulic excavator 1 is in a conveying motion is averaged, and the load (first load) of the object to be worked is determined.

<Load Determining Method for Object to be Worked by Load Calculation Section 50 and Loaded Weight Determining Method for Dump Truck 2 by Load Integration Section 56>

Figure 14:
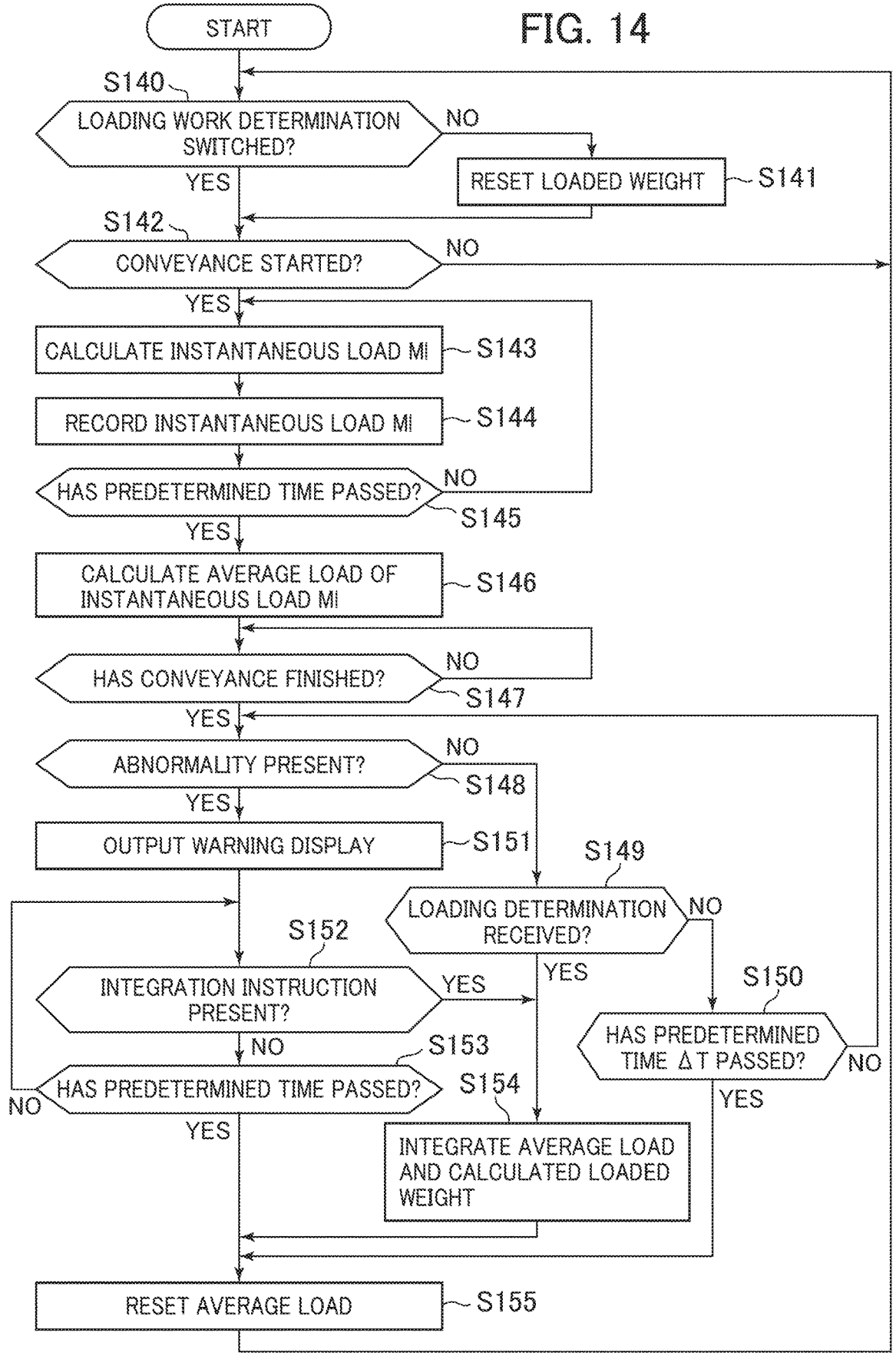
FIG. 14 is a flow chart of processing steps executed by a load calculation section 50, a load integration propriety determination section 55 and a load integration section 56 in the controller 21 on the hydraulic excavator 1 side.

FIG. 14 is a flow chart of processing steps performed by the load calculation section 50, the load integration propriety determination section 55 and the load integration section 56 in the controller 21 on the hydraulic excavator 1 side. Here, using FIG. 14, description will be made of a method in which the load calculation section 50 determines the load (first load) of the object to be worked in the bucket during conveyance, the load integration propriety determination section 55 determines whether or not the load (first load) is to be integrated (third determination), and the load integration section 56 integrates the load and thereby outputs the loaded weight.

The flow chart of FIG. 14 is executed every predetermined sampling period in the controller 21 on the hydraulic excavator 1 side.

First, in step S140, the load integration section 56 determines whether or not the setting of loading work determination outputted at a fixed period Δtv from the dump truck 2 in step S106 of FIG. 6 has been changed over. When it is determined that the loading work determination has not been changed over, the control proceeds to step S142, whereas when it is determined that the loading work determination has been changed over, the control proceeds to step S141 to reset the loaded weight on the dump truck 2, and the control proceeds to step S142. The loaded weight is reset at with the timing when in loading work and in non-loading work are changed over, whereby it is possible to integrate the load of the object to be worked only in the period in which the dump truck 2 is under a loading work.

In step S142, the load calculation section 50 monitors whether or not a conveying motion start determination has been outputted from the conveyance determination section 51. When the conveying motion start determination has been outputted, the control proceeds to step S143, and if not so, the control returns to before step S140, to monitor the output of the loading work determination section 57 (setting of the loading work determination).

In step S143, the load calculation section 50 performs calculations concerning the formulas (2) to (8) to calculate the instantaneous load M1 of the object to be worked, the instantaneous load M1 is recorded in the controller 21 in step S144, and the control proceeds to step S145.

In step S145, the load calculation section 50 determines whether or not a predetermined time has passed from the time of output of the conveying motion start determination (the time when determination of YES is made in step S142). When it is determined here that the predetermined time has not passed, the control returns to before step S143, and step S143 and step S144 are again executed. By repeating step S143 and step S144 in the predetermined time, a plurality of instantaneous loads M1 calculated in the predetermined time can be recorded. On the other hand, when it is determined that the predetermined time has passed, the control proceeds to step S146. In step S146, the load calculation section 50 calculates an average load of the plurality of instantaneous loads M1 recorded within the predetermined time, the average load is made to be a load value (first load) of the object to be worked, and the control proceeds to step S147.

In step S147, the load integration propriety determination section 55 monitors whether or not a conveying motion finish determination has been outputted from the conveyance determination section 51. When it is determined that the conveying motion finish determination has not been outputted, the control returns to before step S147, to continue monitoring the conveying motion finish determination. On the other hand, when it is determined that the conveying motion finish determination has been outputted, a loading operation by the hydraulic excavator 1 is deemed as started, and the control proceeds to step S148. Note that in step S147, a loading operation start determination may be monitored in place of the conveying motion finish determination.

In step S148, the load integration propriety determination section 55 determines whether or not the abnormality determination section 58 has made an abnormality determination. Specifically, determination is made by referring to the result of abnormality determination stored in the inside of the controller 21. Here, when the abnormality determination has not been made (that is, when a normality determination is stored), the control proceeds to step S149, whereas when the abnormality determination has been made (that is, when the abnormality determination is stored), the control proceeds to step S151.

In step S149, the load integration propriety determination section 55 determines whether or not a determination that the loading of the object to be worked onto the dump truck 2 by the hydraulic excavator 1 has been conducted (a loading determination transmitted in step S114 of FIG. 8) has been received from the controller 40 of the dump truck 2. When it is determined that the loading determination has been received, the load integration section 56 integrates the average load computed in step S145 onto the loaded weight (integrated weight) in step S154, and the control proceeds to step S155. On the other hand, when reception of the loading determination is not found in step S149, the control proceeds to step S150.

In step S150, the load integration propriety determination section 55 determines whether or not a predetermined time ΔT has passed from the time of conveying motion finish determination in step S147. As the predetermined time ΔT, there can be set an arbitrary time within a range from (1) a time required for the hydraulic excavator 1 to perform a loading operation to (2) a time required for the hydraulic excavator 1 to perform a series of operations including excavation, conveyance, loading and reaching at the time of a loading work. The predetermined time ΔT may be inputted and determined by the operator through the input device 23B according to the tendency of the required time of each operator concerning the loading work. When it is determined in step S150 that the predetermined time ΔT has not passed, the control returns to before step S148, to again monitor the abnormality determination and the loading determination. On the other hand, when it is determined that the predetermined time ΔT has passed, it is deemed that the hydraulic excavator 1 has completed a conveying motion (has started a loading operation) but the loading of the object to be worked onto the cargo bed 36 of the dump truck 2 has not been performed, and the control proceeds to step S155 by skipping step S154 (that is, without integration of the average load in step S145). A specific example of a case where the control proceeds from step S150 to step S155 is a situation in which the hydraulic excavator 1 puts the bucket 15 into a dump operation, but, since the cargo bed 36 of the dump truck 2 is not located thereunder, the loading of the object to be worked onto the dump truck 2 is failed.

Figure 15:
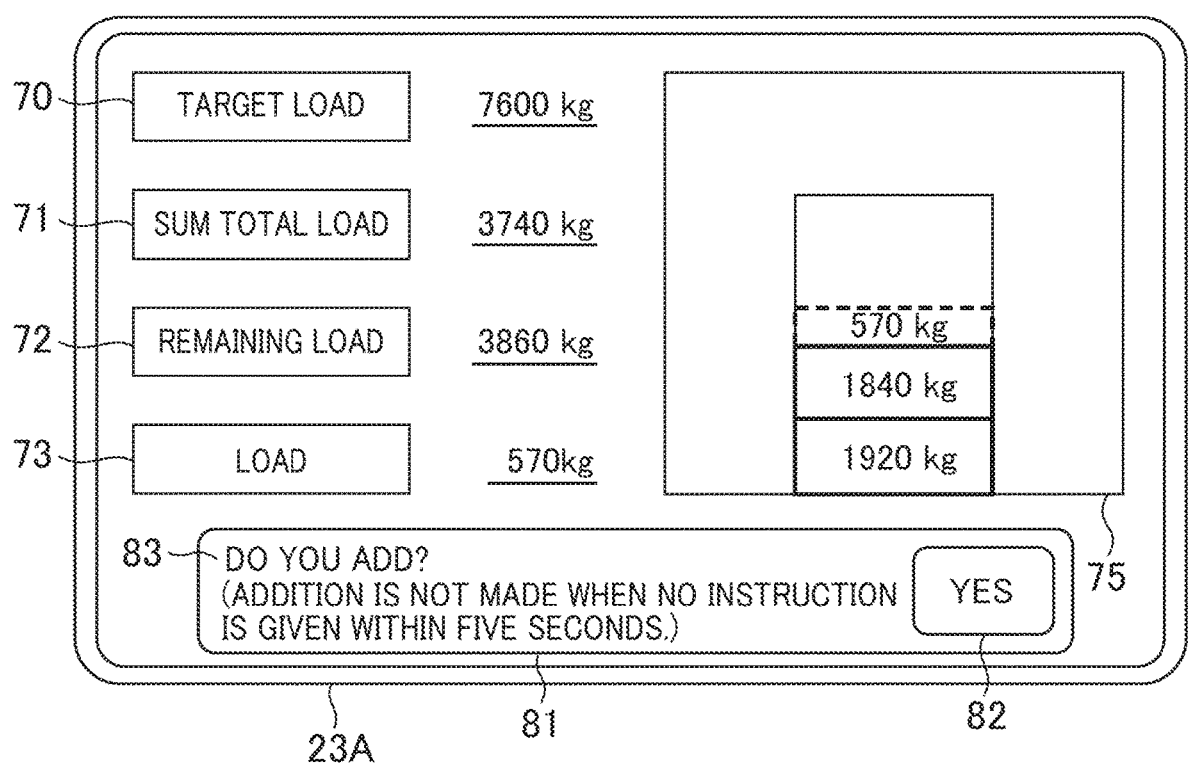
FIG. 15 is an external view of a display screen of a display device 23A.

When it is determined in step S148 that there has been an abnormality, the load integration propriety determination section 55 instructs outputting, to the display device 23A, of a warning display of notifying the operator that automatic load integration is impossible due to system abnormality, and an inquiry display of inquiring the operator if integration is needed, in step S151, whereby the warning display and the inquiry display are displayed on the display device 23A (for the inquiry display, refer to an inquiry display section 81 of FIG. 15 to be described later). When the operator desires to perform integration, in response to the warning display and the inquiry display, an instruction of need for integration is inputted through the input device 23B.

In subsequent step S152, the load integration propriety determination section 55 determines whether or not the instruction of need for integration (this may herein be referred to as "integration instruction") has been inputted by the operator through the input device 23B. Here, when it is determined that the integration instruction has been given from the operator, the load integration section 56 integrates (step S154) the average load computed in step S145 onto the previous loaded weight (integrated load), and the control proceeds to step S155. On the other hand, when the integration instruction is absent, the control proceeds to step S153, to determine whether or not a predetermined time has passed from the warning output in step S151. When it is determined in step S153 that the predetermined time has not passed, the control returns to before step S152, to again monitor the presence or absence of an input of the integration instruction. On the other hand, when it is determined that the predetermined time has passed, the control proceeds to step S155 by skipping step S154.

In step S155, the load calculation section 50 resets the average load calculated in step S146, and the control returns to before step S140.

<Display Screen of Display Device 23A>

FIG. 15 is an external view of a display screen (output screen) of the display device 23A. Using FIG. 15, a displaying method for load measurement results in the load measuring system according to the present embodiment and a method of instructing execution of integration in a case where an abnormality is present in the system will be described.

The display device 23A is configured by a touch panel. The display screen of the display device 23A includes: a target load display section 70 where to display a target loaded weight (target load value) on the dump truck 2; an in-bucket load display section 72 where to display the load value (average load value of the instantaneous load M1) of the object to be worked in the bucket 15 that is calculated in step S146 of FIG. 14; a sum total load display section 71 where to display the integrated value of load value of the object to be worked in the bucket 15 that is calculated in step S154 (integrated load on the dump truck 2); a remainder load display section 72 where to display the difference between the value (target loaded weight) displayed in the target load display section 70 and the value (integrated value of load value) displayed in the sum total load display section 71; an integration bar display section 75 where to display the history of the load value of the object to be worked that is integrated in numerical values and a pile-up vertical bar graph (integration bar); and an inquiry display section 81 where to display an inquiry display (a display of inquiring of the operator whether integration is needed) in step S151.

The value in the in-bucket load display section 72 is updated to a newest value calculated in step S146 of FIG. 14, and is updated to 0 when reset in step S155. The value in the sum total load display section 71 and the display in the integration bar display section 75 are updated to a newest value when step S154 is executed, and are updated to 0 when reset in step S141.

An inquiry display 83 of inquiring of the operator whether or not loading is needed in step S151 when a system abnormality is detected is displayed in the inquiry display section 81. An integration instruction input section 82 as a button to be depressed in the case where the operator desires integration is displayed in the inquiry display section 81 together with the inquiry display 83. When the integration instruction input section 82 is depressed, the load integration propriety determination section 55 determines that an integration instruction has been inputted in step S152. On the other hand, when the integration instruction input section 82 is not depressed, the integration in step S154 is not executed. Note that in the example of FIG. 15, a configuration is adopted in which a remaining time (5 seconds in FIG. 15) from the timing of outputting of the warning display in step S151 until the predetermined time has passed in step S153 is displayed in the inquiry display section 81 together with the inquiry display 83, and, when the remaining time is reduced to zero (that is, when the predetermined time in step S153 has been passed), the display in the inquiry display section 81 disappears.

<Operation>

(1) In the Case of Normality Determination

An operation of the load measuring system configured as above will be described below. First, a case where normality determination (FIG. 11: step S136) has been made by the abnormality determination section 58 of the controller 21 of the hydraulic excavator 1 will be described.

In the embodiment configured as above, when the dump truck 2 in an empty state stops for receiving the loading of the object to be worked by the hydraulic excavator 1, the loading work determination section 57 in the controller 40 changes the loading work determination from in non-loading work to in loading work (FIG. 6: steps S102 and S103), and transmits this result to the controller 21 of the hydraulic excavator 1 (FIG. 6: step S106).

The controller 21 of the hydraulic excavator 1 having received the loading work determination result recognizes the change-over of the loading work determination result and resets the loaded weight (FIG. 14: steps S140 and S141), and starts monitoring whether or not the hydraulic excavator 1 starts a conveying motion (FIG. 14: step S142). When the hydraulic excavator 1 starts a crowding operation of the arm 14 for an excavating motion, the bottom pressure of the arm cylinder 17 exceeds threshold 1 due to load attendant on excavation, thereafter, when the excavating motion is finished and the load is lightened, the bottom pressure of the arm cylinder 17 decreased below threshold 2. In this instance, the conveyance determination section 51 of the controller 21 outputs a determination indicative of that the hydraulic excavator 1 has started the conveying motion (FIG. 10: step S122).

When a conveying motion start determination is outputted from the conveyance determination section 51, the load integration section 56 in the controller 21 repeatedly calculates and records the instantaneous load M1 of the object to be worked in the bucket 15 in a predetermined time, and causes an average load value of the instantaneous loads M1 calculated in the predetermined time to be a load value of the object to be worked (FIG. 14: steps S143 to S146). In other words, the computation of the load value of the object to be worked is conducted during the conveying motion of the hydraulic excavator 1.

The hydraulic excavator 1 having moved the bucket 15 to the upper side of the cargo bed of the dump truck 2 by the conveying motion starts a dumping operation of the bucket 15 for starting a loading operation. In this instance, the arm-bucket relative angle exceeds threshold 3, and the conveyance determination section 51 in the controller 21 outputs a determination indicating that the hydraulic excavator 1 has finished the conveying motion (FIG. 10: step S124). That the conveying motion finish determination is outputted from the conveyance determination section 51 in this way indicates that the hydraulic excavator 1 has started the loading operation, and indicates the object to be worked is soon going to be thrown onto the cargo bed 36 of the dump truck 2 by the hydraulic excavator 1.

When the result of determination by the abnormality determination section 58 is normality determination, the controller 21 of the hydraulic excavator 1 starts monitoring whether or not loading determination is inputted from the controller 40 of the dump truck 2, with the output of conveying motion finish determination from the conveyance determination section 51 as a trigger (FIG. 14: step S149). When the dump truck 2 normally receives the loading of the object to be worked from the hydraulic excavator 1 by the loading operation of the hydraulic excavator 1, the pressures of the suspensions 38a to 38d of the dump truck 2 increase due to the load, and, as a result, the controller 40 transmits the loading determination to the controller 21 of the hydraulic excavator 1 (FIG. 8: step S114).

Upon confirmation of the reception of the loading determination from the dump truck 2, the controller 21 computes the loaded weight on the dump truck 2 by integrating the average load value of the instantaneous loads M1 previously calculated. The loaded weight at the time of first-time loading is an average load value. The computation result of the loaded weight is displayed in the sum total load display section 71 of the display device 23A of the hydraulic excavator 1 (FIG. 15). For the second-time and latter loading operations, also, the same processing as above is repeated when the loading from the hydraulic excavator 1 onto the dump truck 2 is normally performed, and the load value of the object to be worked that is computed by the load calculation section 50 is integrated to the loaded weight.

ON the other hand, in a case where the hydraulic excavator 1 has conducted the loading operation but the cargo bed of the dump truck 2 is not present under the bucket 15 and the loading of the object to be worked onto the dump truck 2 is failed, the loading determination is not transmitted from the controller 40 of the dump truck 2 even when the predetermined time ΔT is passed from the conveying motion finish determination from the conveyance determination section 51. In this case, the controller 21 of the hydraulic excavator 1 deems that the hydraulic excavator 1 has conducted the loading operation but the loading onto the dump truck 2 has been failed for some reason, cancels the integration of the load value of the object to be worked attendant on the this-time loading operation, resets the load value of the object to be worked calculated during the conveying motion, and waits for an output of the next conveying motion start determination.

(2) In the Case of Abnormality Determination

A case where abnormality determination (FIG. 11: step S137) has been made in the abnormality determination section 58 of the controller 21 of the hydraulic excavator 1 will be described below. In this case, also, the flow of operations to the finish of the conveying motion of the hydraulic excavator 1 is the same as that in the case of normality determination, and, therefore, description of the same flow is omitted.

When the result of determination by the controller 21 (abnormality determination section 58) of the hydraulic excavator 1 is abnormality determination, there is a possibility of an abnormality of communication between the two controllers 21 and 40, an abnormality of the suspension pressure sensor 39 of the dump truck 2, or an abnormality of calculation of the load value. In this case, automatic integration of the load value of the object to be worked in the same manner as in the case of normality determination is impossible, and, therefore, a warning display and the inquiry display 83 are outputted to the display device 23A (FIG. 14: step S151). As a result, the operator of the hydraulic excavator 1 can be made to recognize that an abnormality has been generated in the system and automatic computation of an integrated value of the load value of the object to be worked is impossible.

In this instance, the integration instruction input section 82 is displayed on the display device 23A together with the inquiry display 83. When integration is desired, the operator of the hydraulic excavator 1 inputs an integration instruction to the controller 21 through the integration instruction input section 82. When the integration instruction is inputted, the controller 21 computes the loaded weight on the dump truck 2 by integrating the average load value of the instantaneous load M1 previously calculated, in the same manner as in the case of normality determination. As a result, the loaded weight can be computed, even in the case where an abnormality in communication between the two controllers 21 and 40 or an abnormality in the suspension pressure sensor 39 of the dump truck 2 has occurred.

<Effects>

As aforementioned, in the present embodiment, the controller 40 (loading determination section 52) of the dump truck 2 and the controller 21 (conveyance determination section 51) of the hydraulic excavator 1 each determine whether or not the loading from the hydraulic excavator 1 onto the dump truck 2 has been conducted, the controller 21 (load integration propriety determination section 55) of the hydraulic excavator 1 determines the integration propriety of the load value of the object to be worked in the bucket, based on the results of determination by both of the controllers, and, based on the result of this determination, the controller (load integration section 56) of the hydraulic excavator 1 integrates the load value. With the system configured in this way, the loading of the object to be worked from the hydraulic excavator 1 onto the dump truck 2 can be detected without error, and, therefore, the amount loaded onto the dump truck 2 (the loaded weight on the dump truck 2) can be computed accurately.

In addition, in a case where it is not determined by the controller 40 (loading determination section 52) of the dump truck 2 even when the predetermined time ΔT has passed from the determination, that loading has been conducted, by the controller 21 (conveyance determination section 51) of the hydraulic excavator 1, the controller 21 of the hydraulic excavator 1 deems that the hydraulic excavator 1 has conducted a loading operation but the loading onto the dump truck 2 has been failed for some reason, then cancels the integration of the load value of the object to be worked attendant on the loading operation, and waits for the next conveying motion of the hydraulic excavator 1 and the attendant load value calculation and loading operation. Therefore, even when the loading onto the dump truck 2 is failed, the load value integrating processing can be continued without inputting the failure into the controller 21 by the operator of the hydraulic excavator 1 or other person.

Besides, in a case where an abnormality is generated in the system, the inquiry display 83 is displayed on the display device 23A, whereby integration of the load value is manually instructed only in the case of system abnormality, and, therefore, the operational burden on the operator concerning the integration of the load value can be mitigated at normal time. In addition, such a configuration makes it possible to continue integration of the load value even in the case where an abnormality has been generated.

<Others>

Note that the present invention is not limited to the above-described embodiment, and includes various modifications made without departing from the scope of the gist thereof. For instance, the present invention is not limited to the configuration that includes all the components described in the above embodiment, and includes configurations in which part of the components is eliminated. Besides, part of the components according to an embodiment may be added to or replaced by components according to another embodiment.

Figure 16:
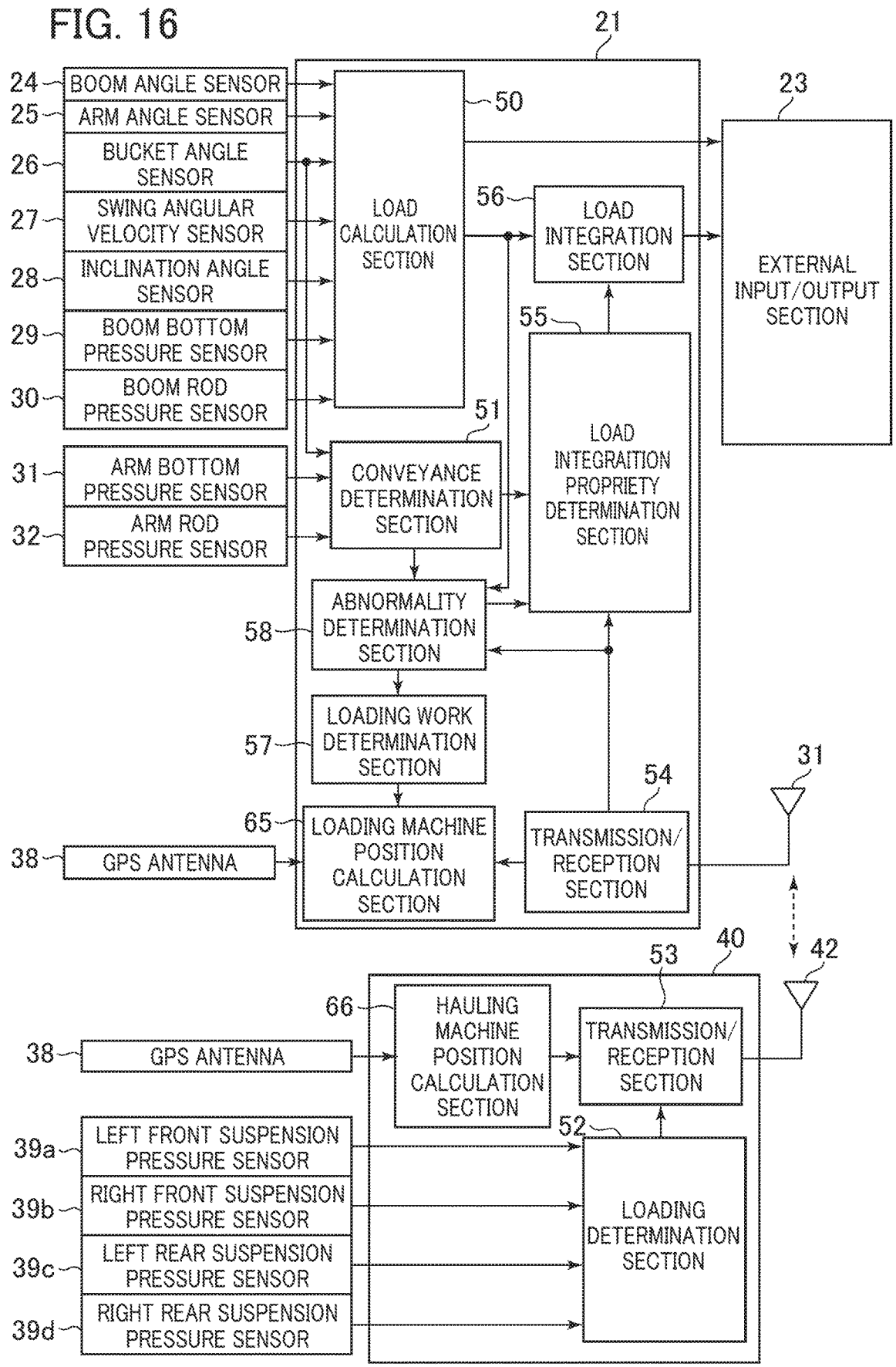
FIG. 16 is a system configuration diagram of a load measuring system according another embodiment of the present invention.
Figure 17:
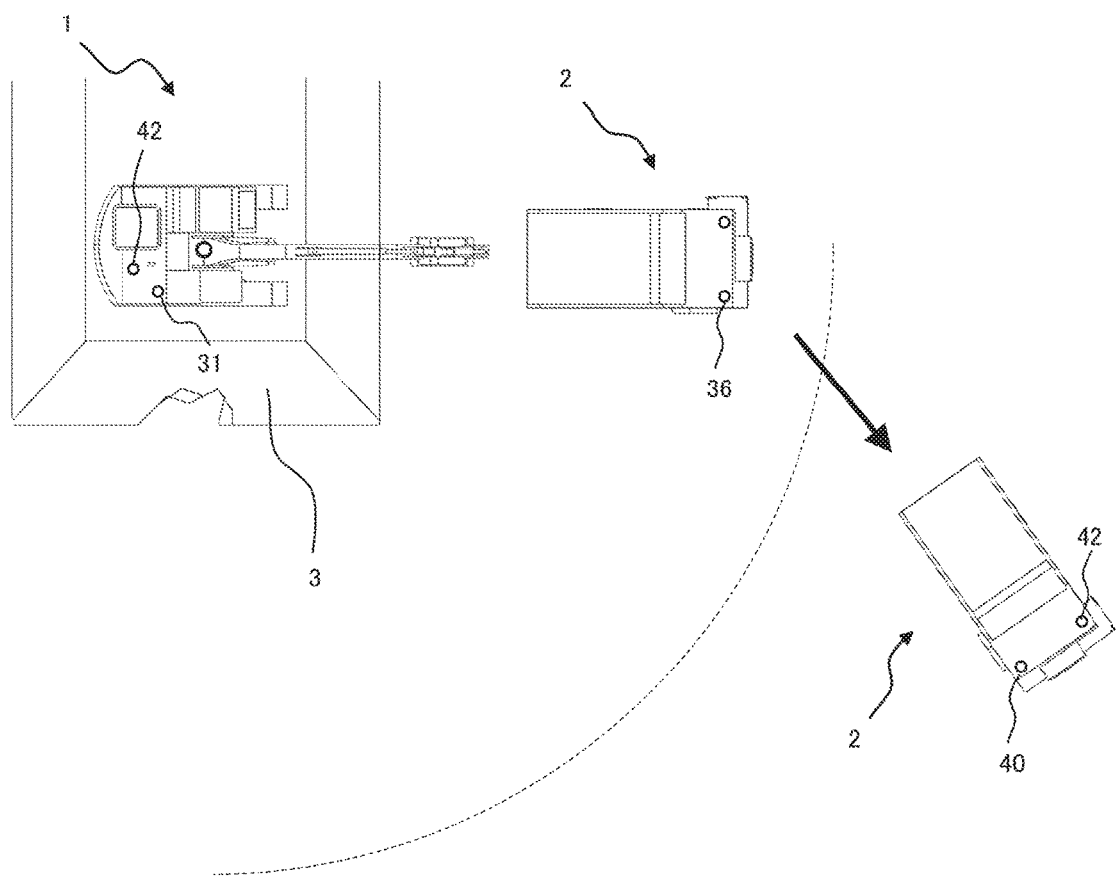
FIG. 17 is an illustration of a determining method for a loading work onto the dump truck 2 by the system of FIG. 16.

The determining method for the loading work of the dump truck 2 is not limited to the method depicted in FIGS. 6 and 7. FIGS. 16 and 17 are illustrations of a system that performs a determining method for the loading work of the dump truck 2, different from that of the above-described embodiment. FIG. 16 depicts a system configuration of the load measuring system, and FIG. 17 is an illustration of the determining method for the loading work of the dump truck 2 by the system of FIG. 16. The dump truck 2 includes a GPS antenna 38, the controller 40 thereof is provided therein with a hauling machine position calculation section 66 that calculates an absolute position of the dump truck 2 based on an input signal from the GPS antenna 38, and the position of the hauling machine itself computed by the hauling machine position calculation section 66 is transmitted to the controller 21 of the hydraulic excavator 1. In addition, the hydraulic excavator 1 includes a GPS antenna 38, the controller 21 thereof is provided therein with a loading machine position calculation section 65 that calculates an absolute position of the hydraulic excavator 1 based on an input signal from the GPS antenna 38, and a loading work determination section 57 that determines a loading work status of the dump truck 2 based on the position information (relative distance) concerning the hydraulic excavator 1 and the dump truck 2 inputted from the loading machine position calculation section 65 and the hauling machine position calculation section 66. When it is determined that the dump truck 2 is present at a position within a predetermined distance indicated by broken line from the hydraulic excavator 1 as illustrated in FIG. 18, the loading work determination section 57 sets the loading work determination to in loading work. When it is determined that the dump truck 2 is present at a position spaced more from the hydraulic excavator 1 than the predetermined distance, the loading work determination section 57 sets the loading work determination to in non-loading work. Where the system is configured in this way, also, the same or similar effect to that of the above-described embodiment can be produced.

With respect to the flow chart of FIG. 14, when determination in step S150 is YES, the control may proceed to step S151 in place of step S155. The processing steps subsequent to step S151 in this case is as depicted in FIG. 14. When determination in step S150 is YES, it is considered that the loading onto the dump truck 2 has been failed. In view of this, a warning display and an inquiry display are made on the display device 23A, thereby prompting the operator to input an integration instruction after again performing loading by the hydraulic excavator 1. Such a configuration ensures that the operator can be made to recognize that the integration is being interrupted due to failure in loading, and a state in which automatic integration is possible before failure in loading can be restored with the integration instruction as a trigger.

In regard to step S151 of FIG. 14, upon abnormality determination the warning display and the inquiry display 83 are performed on the display device 23A independently of the cause of the abnormality determination, as described in the present embodiment; however, when abnormality is present in load computation by the controller 21 or the controller 40 (specifically, when determination in step S135 of FIG. 12 is NO), an error may exist in the load value of the object to be worked. Therefore, the system may be configured such as not to perform the inquiry display 83 but to perform only the abnormality display in this case, thereby preventing an erroneous load value from being integrated due to an operator's integration instruction.

While the abnormality determination section 58 is provided in the controller 21 on the hydraulic excavator 1 side in the above-described embodiment, this may be omitted. In the case where the abnormality determination section 58 is omitted, it is sufficient to configure the control system such as to proceed to step S149 when determination in step S148 in the flow chart of FIG. 14 is YES, and to return to step S149 when determination in step S150 is NO.

In addition, the configuration of the load measuring system of the present invention is not limited to the one depicted in FIG. 5. For example, the loading determination section 52 may not necessarily be mounted in the controller 40 of the dump truck 2, and the controller 40 may be configured such that signals from the suspension pressure sensors 39a to 39d are inputted to the transmission/reception section 53, and may be transmitted from the wireless transceiver 42 directly to the hydraulic excavator 1, whereby the processing corresponding to the calculation processing performed by the loading determination section 52 is executed by the controller 21 of the hydraulic excavator 1.

The calculation of the instantaneous load M1 is not limited to the model depicted in FIG. 13, but may be conducted using different formulas than those described above. For instance, the instantaneous load may be calculated using an equation of motion of the front work implement 12 including the boom 13, the arm 14 and the bucket 15.

The computing method for the load value of the object to be worked is not limited to the technique depicted in FIG. 14. For example, the period for averaging the load may be determined using the magnitude of the swing angular velocity and the position of the bucket 15.

The loading determination concerning the dump truck 2 is not limited to the contents depicted in FIGS. 8 and 9. For instance, a configuration may be adopted in which an acceleration sensor is attached to the vessel 36 or the machine body, a variation in the acceleration in the vertical direction generated due to throwing of the object to be worked into the vessel 36 is detected by the acceleration sensor, and the loading determination is outputted.

The contents of display on the display device 23A are not limited to those depicted in FIG. 15. For example, the proportion of the integrated load based on the dump truck capacity may be displayed in percent, and a part where to display a history of loaded amounts (loaded weights) in the past in an aligned manner may be provided on the display screen.

Components of the controller 40 and the controller 21 as well as the functions of and processing steps executed by the components, etc. may be partly or entirely realized by hardware (for example, designing the logics for executing the functions in the form of integrated circuit). In addition, the components concerning the controllers 40 and 21 may be provided in the form of programs (software) to be read and executed by a calculation processing device (e.g., CPU) for implementing the functions concerning the components of the controllers 40 and 21. Information concerning the programs can be stored in, for example, semiconductor memory (flash memory, SSD, etc.), magnetic recording device (hard disk drive, etc.) and recording medium (magnetic disk, optical disk, etc.).

DESCRIPTION OF REFERENCE CHARACTERS

1: Hydraulic excavator
2: Dump truck
12: Front work implement
13: Boom
14: Arm
15: Bucket
16: Boom cylinder
17: Arm cylinder
18: Bucket cylinder
21: Controller (loading machine side controller)
23: External input/output device
23A: Display device
23B: Input device 24: Boom angle sensor
25: Arm angle sensor
26: Bucket angle sensor
27: Swing angular velocity sensor
28: Inclination angle sensor
29: Boom bottom pressure sensor
30: Boom rod pressure sensor
31: Arm bottom pressure sensor
32: Arm rod pressure sensor
33: Wireless transceiver
36: Cargo bed
38: Suspension
39: Suspension pressure sensor
40: Controller (hauling machine side controller)
41: Display device
42: Wireless transceiver
43: Machine speed sensor
50: Load calculation section
51: Conveyance determination section
52: Loading determination section
53: Transmission/reception section
54: Transmission/reception section
55: Load integration propriety determination section
56: Load integration section
57: Loading work determination section
58: Abnormality determination section
70: Target load display section
71: Sum total load display section
72: Load display section
81: Inquiry display section
82: Integration instruction input section
83: Inquiry display

The invention claimed is:

1. A hydraulic excavator comprising:
a hydraulic cylinder driven by a hydraulic fluid delivered from a hydraulic pump;
a work implement driven by the hydraulic cylinder, the work implement including a bucket; and
a hydraulic excavator side controller that calculates a loaded weight of an object to be worked loaded onto a hauling machine by the work implement,
wherein the hydraulic excavator side controller
performs a first determination of determining whether or not the loading work of the object to be worked onto the hauling machine by the hydraulic excavator has been conducted based on posture of the work implement,
calculates a first load that is a load of the object to be worked loaded in the bucket based on a thrust force of the hydraulic cylinder and a determination result of the first determination,
receives a result of a second determination from a hauling machine side controller, the result of the second determination determining whether or not the object to be worked is loaded onto the hauling machine by the hydraulic excavator, the hauling machine side controller being included in the hauling machine,
performs a third determination of determining whether or not the first load is to be integrated based on the result of the second determination received from the hauling machine side controller and the result of the first determination determined by the hydraulic excavator side controller, and
calculates the loaded weight on the hauling machine by integrating the first load in a case where it is determined by the third determination that the first load is to be integrated, the third determination being performed by the hydraulic excavator side controller.

2. The hydraulic excavator according to claim 1,
wherein the hydraulic excavator side controller integrates the first load in a case where a determination result by the second determination that the loading of the object to be worked onto the hauling machine has been conducted is received from the hauling machine side controller within a predetermined time from the determination by the first determination that the loading work of the object to be worked onto the hauling machine has been conducted.

3. The hydraulic excavator according to claim 1,
wherein the hydraulic excavator side controller
performs a fourth determination of determining start and finish of a conveying motion of the hydraulic excavator for the hauling machine based on the posture of the work implement,
calculates the first load based on the thrust force of the hydraulic cylinder during a period from the start to the finish of the conveying motion determined by the fourth determination, and
integrates the first load in a case where it is determined by the fourth determination that the conveying motion has been finished and where a determination result by the second determination that the loading of the object to be worked onto the hauling machine by the hydraulic excavator has been conducted is received from the hauling machine side controller.

4. The hydraulic excavator according to claim 1, further comprising:
an input device for inputting an instruction from an operator; and
a display device for displaying predetermined information,
wherein the hydraulic excavator side controller
performs a fifth determination of determining presence or absence of an abnormality in the hauling machine based on the weight of the object to be worked loaded onto the hauling machine that is transmitted from the hauling machine side controller, and
in a case where it is determined by the fifth determination that an abnormality is present in the hauling machine, notifies generation of the abnormality through the display device, and integrates the first load in a case where it is inputted through the input device that the loading of the object to be worked onto the hauling machine has been conducted.

5. The hydraulic excavator according to claim 1, further comprising:
an input device for inputting an instruction from an operator; and
a display device for displaying predetermined information,
wherein the hydraulic excavator side controller
determines that an abnormality is present in either of the hydraulic excavator and the hauling machine in a case where a difference between a second load that is a load of the object to be worked loaded onto the hauling machine by the hydraulic excavator that is calculated by the hauling machine side controller and the first load exceeds a predetermined value, and
in a case where it is determined that an abnormality is present in either of the hydraulic excavator and the hauling machine, notifies generation of the abnormality through the display device, and integrates the first load in a case where it is inputted through the input device that the loading of the object to be worked onto the hauling machine has been conducted.

6. The hydraulic excavator according to claim 1,
wherein the hydraulic excavator side controller performs a sixth determination of determining whether or not the hauling machine is under a loading work of the object to be worked by the hydraulic excavator based on a traveling speed of the hauling machine that is transmitted from the hauling machine, and resets an integrated value of the load of the object to be worked in a case where a result of sixth determination is changed over.

* * * * *